(12) United States Patent
Kasuga et al.

(10) Patent No.: US 12,384,349 B1
(45) Date of Patent: Aug. 12, 2025

(54) ELECTRO-HYDRAULIC ACTUATOR AND BRAKE DEVICE

(71) Applicant: ICAN COMPANY LTD., Tokyo (JP)

(72) Inventors: Toshishige Kasuga, Tokyo (JP); Masao Umezawa, Tokyo (JP); Takahiro Yasunaga, Tokyo (JP)

(73) Assignee: ICAN COMPANY LTD., Tokyo (JP)

( * ) Notice: Subject to any disclaimer, the term of this patent is extended or adjusted under 35 U.S.C. 154(b) by 0 days.

(21) Appl. No.: 19/100,122

(22) PCT Filed: Apr. 26, 2024

(86) PCT No.: PCT/JP2024/016456
§ 371 (c)(1),
(2) Date: Jan. 31, 2025

(87) PCT Pub. No.: WO2024/252822
PCT Pub. Date: Dec. 12, 2024

(30) Foreign Application Priority Data

Jun. 9, 2023  (JP) ................................ 2023-095586
Feb. 6, 2024  (JP) ................................ 2024-016498

(51) Int. Cl.
*B60T 13/74* (2006.01)
*B60T 13/66* (2006.01)
(Continued)

(52) U.S. Cl.
CPC .......... *B60T 13/745* (2013.01); *B60T 13/662* (2013.01); *F15B 15/18* (2013.01); *F15B 13/042* (2013.01);
(Continued)

(58) Field of Classification Search
CPC .... B60T 13/662; B60T 13/148; B60T 13/168; F16D 2127/02; F16D 2129/02
See application file for complete search history.

(56) References Cited

U.S. PATENT DOCUMENTS 7,055,317 B2 *  6/2006  Knapp ................ F15B 11/0423
                                              60/478
10,077,816 B2 *  9/2018  Gentzsch ................ F16D 59/02
(Continued)

FOREIGN PATENT DOCUMENTS

JP    S48-064655 A    9/1973
JP    S63-101503 A    5/1988
(Continued)

OTHER PUBLICATIONS

International Search Report (ISR) for Application No. PCT/JP2024/016456 dated Jul. 16, 2024.
(Continued)

*Primary Examiner* — Thomas E Lazo
(74) *Attorney, Agent, or Firm* — Isshiki & Partners; Joseph Farrar

(57) ABSTRACT

An electro-hydraulic actuator includes a pump powered by a motor, a hydraulic actuator biased to a first state that reciprocates between the first state and a second state, a reservoir, and a hydraulic circuit. The hydraulic circuit includes a pressurizing flow path that supplies fluid from the pump to the hydraulic actuator, a discharge flow path that discharges fluid from the hydraulic actuator to the reservoir via an unloading valve, a pilot flow path that branches off midway through the pressurizing flow path and supplies fluid pressurized to a pilot pressure to the unloading valve, a mechanism that generates pilot pressure while the pump is operating, and a check valve that allows fluid to pass only from the pump to the hydraulic cylinder. The hydraulic circuit transitions to the second state when the pump is operating, and returns to the first state and when the pump is stopped.

5 Claims, 16 Drawing Sheets

(51) Int. Cl.
  *F15B 15/18*   (2006.01)
  *F15B 13/042*  (2006.01)
  *F16D 127/02*  (2012.01)
  *F16D 129/02*  (2012.01)
(52) U.S. Cl.
  CPC ...... *F16D 2127/02* (2013.01); *F16D 2129/02* (2013.01)

(56) References Cited

U.S. PATENT DOCUMENTS 10,228,031 B2  3/2019  Gentzsch
11,815,108 B2 * 11/2023  Kasuga .................. F16D 65/28

FOREIGN PATENT DOCUMENTS

| JP | 2017-207139 A | 11/2017 | |
|---|---|---|---|
| JP | 6322699 B2 | 5/2018 | |
| JP | 6353036 B2 | 7/2018 | |
| JP | 7262870 B2 | 4/2023 | |
| WO | WO-2022137882 A1 * | 6/2022 | ............ B60T 13/588 |

OTHER PUBLICATIONS

Translation of the ISR for Application No. PCT/JP2024/016456 dated Jul. 16, 2024.

* cited by examiner

LOADED STATE                UNLOADED STATE

ELECTRO-HYDRAULIC ACTUATOR AND BRAKE DEVICE

CROSS REFERENCE TO RELATED APPLICATIONS

The present application is a national phase entry under 35 U.S.C. § 371 of International Application No. PCT/JP2024/016456, filed on Apr. 26, 2024, which claims priority to Japanese Patent Application No. 2023-095586, filed on Jun. 9, 2023, and Japanese Patent Application No. 2024-016498, filed on Feb. 6, 2024, the entire contents of each of which are incorporated by reference herein.

TECHNICAL FIELD

The present invention relates to an electro-hydraulic actuator and a brake device.

BACKGROUND ART

An electro-hydraulic actuator includes a pump (impeller pump, gear pump, etc.) operated by a motor, a hydraulic actuator operated by hydraulic fluid (hydraulic oil, etc.) pressurized by the pump, and a hydraulic circuit. The hydraulic circuit includes a flow path for the hydraulic fluid that connects the pump, a reservoir, and the hydraulic actuator, and a valve mechanism disposed within the flow path that supplies the hydraulic fluid accumulated in the reservoir to the hydraulic actuator to operate the hydraulic actuator and discharges the hydraulic fluid from the hydraulic actuator in an operating state toward the reservoir.

As an electro-hydraulic actuator, electric oil-hydraulic cylinders that use an oil hydraulic cylinder as the hydraulic actuator are well known. The hydraulic circuit (hydraulic oil circuit) of the electric oil hydraulic cylinder controls a pump operated by the power of a motor and a valve mechanism installed in an appropriate position of the hydraulic circuit, and, for example, forms a flow path of hydraulic oil, which is the hydraulic fluid, in the order of the reservoir, the pump, and the hydraulic cylinder, fills a cylinder tube of the oil hydraulic cylinder with hydraulic oil, and pushes up a piston. Note that some other mechanism to be operated is connected to the tip of the piston rod, and the operation of the other mechanism is linked to the operation of the electric oil hydraulic cylinder. In addition, the piston is constantly biased in a direction to be pushed down by the restoring force of the other mechanism or a mechanism such as a spring (hereinafter sometimes referred to as a "biasing mechanism") provided in the electric oil hydraulic cylinder, and when the supply of hydraulic oil to the cylinder tube is stopped by the hydraulic circuit and a flow path connecting the inside of the cylinder tube and the reservoir is formed, the piston is pushed down by the biasing mechanism.

The electric oil hydraulic cylinder is used, for example, in an electric booster brake. In the electric booster brake, when the electric oil hydraulic cylinder is energized to push up the piston rod, a braking mechanism such as a drum brake or a disk brake operates to release the brake pads. The braking mechanism is constantly biased in a direction to return to a braking state by a spring or the like, and when the power supply to the electric oil hydraulic cylinder is turned off, the hydraulic oil in the hydraulic cylinder is discharged and the biasing force of the braking mechanism presses the brake pads against the brake drum or brake disk. This causes the brake device to enter a braking state. The hydraulic circuit of the electric oil hydraulic cylinder used in the electric booster brake includes an electromagnetic valve and its control circuit, and forms a flow path for filling the hydraulic cylinder with hydraulic oil and returning the filled hydraulic oil to a reservoir by controlling the opening and closing of the electromagnetic valve disposed at an appropriate position in the flow path.

The electric oil hydraulic cylinder used in the electric oil hydraulic booster brake is disclosed as an "electro-hydraulic brake release device" in, for example, the following Patent Documents 1 and 2. Also, the following Patent Document 3 discloses an "electro-hydraulic actuator" and a "disc brake device" equipped with the electro-hydraulic actuator.

CITATION LIST

Patent Documents

Patent Document 1 U.S. Pat. No. 6,322,699
Patent Document 2 U.S. Pat. No. 6,353,036
Patent Document 3 U.S. Pat. No. 7,262,870

SUMMARY OF INVENTION

Technical Problem

Generally, in the hydraulic circuit of an electro-hydraulic actuator, solenoid valves are arranged at appropriate positions in the flow path of the hydraulic fluid. By controlling the opening and closing of the appropriate solenoid valves, the hydraulic circuit can quickly switch between a flow path for directing the hydraulic fluid pressurized by the pump to the hydraulic actuator and a flow path for forcibly discharging the hydraulic fluid from the hydraulic actuator and returning it to the reservoir. In this way, the solenoid valve can operate the hydraulic circuit at high speed and with high precision.

However, since the solenoid valves require electricity, the hydraulic circuit cannot operate normally if the supply of electricity is stopped. The solenoid valves may also malfunction due to electrical interference from their surroundings. Therefore, when an electro-hydraulic actuator is used for an electric booster brake, a hydraulic circuit equipped with some kind of safety mechanism is required to reliably discharge the hydraulic fluid in the actuator even in the event of a power outage or when the solenoid valve malfunctions. Daily maintenance and inspection are also required to ensure that the safety mechanism operates reliably in the event of an emergency. Therefore, the installation costs and maintenance costs of an electro-hydraulic actuator are likely to increase due to the hydraulic circuit equipped with a solenoid valve.

Furthermore, when a solenoid valve is energized for a long period of time or when it is operated repeatedly at a high frequency, the power consumption increases. Increased power consumption leads to higher running costs. In addition, unlike a motor, a solenoid valve in an electro-hydraulic actuator is in direct contact with the hydraulic fluid, and therefore the viscosity of the hydraulic fluid may decrease due to heat generated by increased power consumption, which may result in the hydraulic pressure required for the operation of the hydraulic actuator not being obtained. If a cooling mechanism the like is provided in the electro-hydraulic actuator a countermeasure against heat generation, it becomes difficult to miniaturize the electro-hydraulic actuator and to provide the electro-hydraulic actuator at a lower cost.

Accordingly, the present invention has been made to solve the above-mentioned problems, and aims to provide an electro-hydraulic actuator equipped with a hydraulic circuit that can reliably discharge the hydraulic fluid in the actuator without using a solenoid valve, and a brake device equipped with such an electro-hydraulic actuator.

Solution to Problem

To achieve the above-described object, the present invention provides an electro-hydraulic actuator including a motor that outputs rotational power;
a pump operated by the rotational power of the motor;
a hydraulic actuator operated by hydraulic fluid pressurized by the pump;
a reservoir for storing the hydraulic fluid; and
a hydraulic circuit for hydraulically controlling operation of the hydraulic actuator,
wherein the hydraulic actuator reciprocates between a first operating state and a second operating state in response to a hydraulic pressure of the supplied hydraulic fluid, and is constantly biased in a direction returning to the first operating state;
wherein the hydraulic circuit includes:
a pressurizing flow path supplying the hydraulic fluid pressurized by the pump to the hydraulic actuator;
a pressure reducing flow path that connects the hydraulic actuator and the reservoir via an unloading valve in an openably closable manner;
a pilot flow path for supplying hydraulic oil pressurized to a pilot pressure to the unloading valve in order to close the pressure reducing flow path;
a pilot pressure generating mechanism that generates the pilot pressure; and
a check valve disposed within the pressurizing flow path for allowing the hydraulic fluid to pass only in a forward direction from the pump to the hydraulic actuator,
wherein the pilot pressure generating mechanism generates the pilot pressure during operation of the pump,
the pilot flow path branches off midway from the pump to the check valve in the pressurizing flow path and reaches the unloading valve, and
during operation of the pump, the pilot pressure is generated, causing the pump to transition to the second operating state, and when the pump stops, the pilot pressure disappears, the pressure reducing flow path is opened, and the pump returns to the first operating state.

The electro-hydraulic actuator may be configured such that a throttle mechanism constituting the pilot pressure generating mechanism and the check valve are disposed, in that order, in the pressurizing flow path extending from the pump to the hydraulic actuator. The throttle mechanism may be an orifice.

The check valve may also serve as the pilot pressure generating mechanism, delivering the hydraulic fluid in a direction toward the hydraulic actuator when the hydraulic fluid supplied from the pump has a predetermined pilot pressure or higher.

The electro-hydraulic actuator may be one in which the pilot pressure generating mechanism is composed of an unloading relief valve having a parent valve and a child valve, and a throttle mechanism,
the parent valve has a built-in throttle valve, a parent valve primary port connected to the pilot flow path, a parent valve secondary port connected to a flow path communicating with the reservoir, a parent valve pilot port communicating with the parent valve primary port via the throttle valve, and has, with a predetermined direction being the up-down direction, a parent valve spool that is urged upward by hydraulic pressure at the parent valve primary port, and a parent valve spring that urges the parent valve spool downward,
the child valve has a child valve primary port connected to the parent valve pilot port, a child valve secondary port connected to a flow path communicating with the reservoir via the throttle mechanism, and a child valve pilot port connected to a flow path from the check valve to the hydraulic actuator, and has, with a predetermined direction being a vertical direction, a valve body that is urged upward by hydraulic pressure at the child valve primary port, a child valve spool that is urged upward by hydraulic pressure at the child valve pilot port, and a child valve spring that urges the valve body downward,
the child valve distributes hydraulic pressure P1 at the child valve primary port into hydraulic pressure P2, which presses the valve body upward, and hydraulic pressure P3, which presses the child valve spool downward, with P2>P3, and when the hydraulic pressure P1 reaches a predetermined cutout pressure, the valve body is pressed in one direction, opening the child valve primary port and the child valve secondary port to enter an unloaded state,
the parent valve spool is pressed upward by a pressure difference between the hydraulic pressure P1 on the parent valve pilot port side, which has been reduced in association with the unloaded state of the child valve, and hydraulic pressure P5 on the parent valve primary port side, thereby opening the parent valve primary port and the parent valve secondary port and putting the parent valve in an unloaded state,
when the child valve is in an unloaded state, the unloaded state is maintained by hydraulic pressure P4 at the child valve pilot port,
when both the parent valve and the child valve are in the unloaded state, the hydraulic pressure P5 is maintained at the pilot pressure by the hydraulic pressure P1 generated by the passing resistance of the throttle mechanism and the hydraulic pressure generated by the parent valve spring urging the parent valve spool downward, and the hydraulic actuator is maintained in the second operating state by the hydraulic pressure P4.

The electro-hydraulic actuator may be one in which the unloading relief valve is a single integrated unit in which the parent valve and the child valve are attached to a metal block in which a flow path for the hydraulic fluid is formed, and the parent valve and the child valve are cartridges configured to be attachably detachable from the metal block. The throttle mechanism may be disposed within the flow path formed in the metal block, and the unit may constitute the pilot pressure generating mechanism.

The electro-hydraulic actuator may be one in which the hydraulic circuit includes a flow path that branches off from the pilot flow path, passes through a throttle mechanism, and reaches the reservoir; and the throttle mechanism has a flow path resistance higher than a flow path resistance of the pilot pressure generating mechanism when the pump is in operation, and eliminates residual pressure of the hydraulic fluid remaining in a flow path from the pump to the pilot pressure generating mechanism in the pressurizing flow path and in the pilot flow path when the pump is stopped.

In any of the above-described electro-hydraulic actuators, the hydraulic actuator may be a direct-acting hydraulic actuator. The electro-hydraulic actuator may be in the first operating state when the piston of the direct-acting hydraulic actuator is at bottom dead center, and in the second operating state when the piston is at top dead center, and the piston is biased in the direction toward bottom dead center by an external mechanism connected to a tip of a piston rod. The electro-hydraulic actuator may be in the first operating state when the piston of the direct-acting hydraulic actuator is at bottom dead center, and in the second operating state when the piston is at top dead center, and may include a spring mechanism that constantly biases the piston toward bottom dead center.

The scope of the present invention also includes a brake device equipped with an electro-hydraulic actuator in which the hydraulic actuator is a direct-acting hydraulic actuator, the brake device having a braking mechanism that presses or separates brake linings against both sides of a circular brake disc, the braking mechanism being constantly biased in the direction of a braking state, and the braking state of the brake disc being released when the electro-hydraulic actuator is in the second operating state, and the brake disc being in a braking state when the electro-hydraulic actuator is in the first operating state.

A brake device equipped with an electro-hydraulic actuator in which the hydraulic actuator is a direct-acting hydraulic actuator can also be a brake device that includes a braking mechanism that presses or separates brake linings against both sides of a circular brake disc, and in which the braking mechanism releases the braking state of the brake disc when in the second operating state and the brake disc is in a braking state when in the first operating state.

Advantages of the Invention

According to the present invention, there is provided an electro-hydraulic actuator having a hydraulic circuit capable of reliably discharging the hydraulic fluid inside the actuator without using a solenoid valve, and a brake device having the electro-hydraulic actuator. Other advantages will become apparent from the following description.

DETAILED DESCRIPTION OF PREFERRED EMBODIMENTS

Figure 1A:
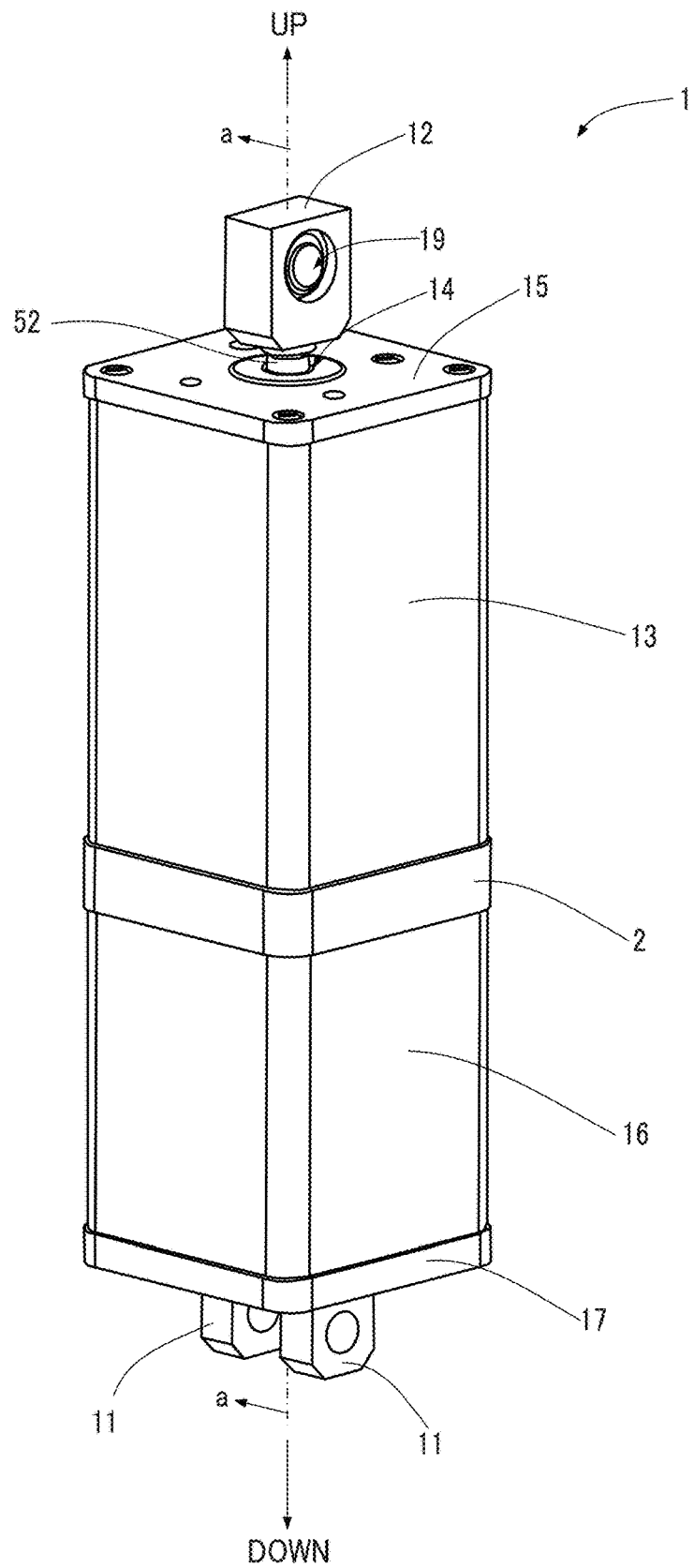
FIG. 1A is a diagram illustrating the external appearance of an electro-hydraulic actuator according to an embodiment.

Embodiments of the present invention are described below with reference to the accompanying drawings. In the drawings used in the following description, the same or similar parts may be designated by the same reference numerals and redundant description may be omitted. In some drawings, unnecessary reference numerals may be omitted from the description.

Embodiments of the present invention are described below with reference to the accompanying drawings. In the drawings used in the following description, the same or similar parts may be designated by the same reference numerals and redundant description may be omitted. In some drawings, unnecessary reference numerals may be omitted from the description.

EMBODIMENTS

Electro-Hydraulic Actuator

Figure 1B:
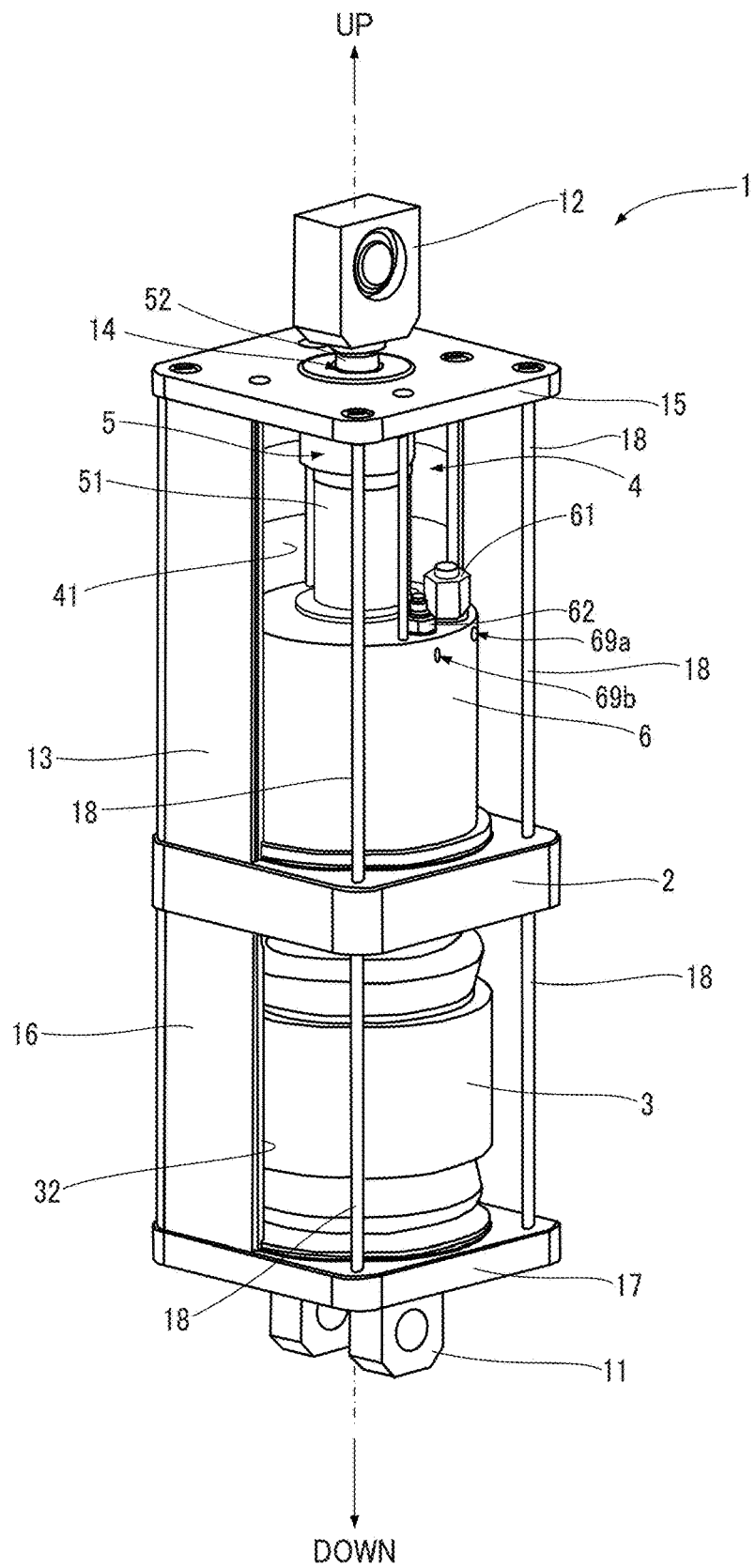
FIG. 1B is a diagram illustrating the configuration inside a housing of an electro-hydraulic actuator according to the embodiment.

As an embodiment of the present invention, an electric oil hydraulic cylinder using a hydraulic cylinder that is a direct-acting hydraulic actuator as a hydraulic actuator is described. FIG. 1A is a diagram illustrating the external appearance of an electro-hydraulic actuator (hereinafter, sometimes referred to as "thruster 1") according to a first embodiment, and FIG. 1B is a diagram illustrating the configuration inside the housing of the thruster 1. As shown in FIG. 1A, the thruster 1 has a square cylindrical appearance shape, and a clevis 11 for fixing the thruster 1 to other equipment is attached to one end surface. At the other end side, the tip side of a piston rod 52 of a built-in hydraulic cylinder protrudes so as to be able to reciprocate in the axial direction. At the tip of the piston rod 52, a head 12 is attached that is connected to a mechanism (hereinafter, sometimes referred to as "external mechanism") linked to the operation of the thruster 1. In addition, a hole 19 for attaching the external mechanism is formed in the head 12.

If the direction of reciprocating motion of the piston rod 52 is defined as the up-down direction, and the up-down directions of the thruster 1 are defined as the piston rod 52 protruding above the thruster 1, then the thruster 1 has an overall structure in which an upper structure and a lower structure are connected via a flat rectangular tubular metal block 2 whose thickness direction is the up-down direction. The upper structure of thruster 1 is a housing (hereinafter sometimes referred to as "upper housing") that is composed of the metal block (hereinafter sometimes referred to as "connecting block 2"), a hollow rectangular tubular cover (hereinafter sometimes referred to as "upper cover 13"), and a metal plate (hereinafter sometimes referred to as "upper cover plate 15") with an insertion hole 14 for the piston rod 52, and the members and mechanisms that constitute thruster 1 are housed within this upper housing. The lower structure includes a housing (hereinafter sometimes referred to as "lower housing") consisting of the connecting block 2, a hollow rectangular cylindrical cover (hereinafter sometimes referred to as "lower cover 16"), and a metal plate (hereinafter sometimes referred to as "base plate 17") to which a clevis 11 is attached, and the components and mechanisms that constitute the thruster 1 are also housed within this lower housing.

As illustrated in FIG. 1B, a motor 3 is installed in the lower housing of the thruster 1. The connecting block 2 and the base plate 17 are connected via mounting bolts 18, and when the mounting bolts 18 are fastened, the lower cover is sandwiched between the connecting block 2 and the base plate 17 to form the lower housing. The upper housing is formed when the mounting bolts 18 that connect the connecting block 2 and the top cover plate 15 are fastened, and the upper cover is sandwiched between the connecting block 2 and the base plate 17.

The space in the upper housing is mostly occupied by a reservoir 4 filled with hydraulic oil. The reservoir 4 is formed by a closed space formed by the upper surface of the connecting block 2, a hollow cylindrical reservoir case 41 coaxially inscribed with the hollow rectangular cylindrical upper cover 13, and the lower surface of the upper cover plate 15. In the thruster 1 according to the embodiment, a cylindrical metal block (hereinafter sometimes referred to as "manifold block 6") in which a flow path for the hydraulic oil is formed, a hydraulic cylinder 5, and various valves (61, 62) arranged at appropriate positions in the hydraulic circuit, etc., are contained in the reservoir 4. In addition, the lower end side of the cylinder tube 51, which serves as the housing of the hydraulic cylinder 5, and various valves (61, 62) are attached to the upper surface of the manifold block 6. Furthermore, a pump is installed in a space formed inside the manifold block 6.

Figure 2:
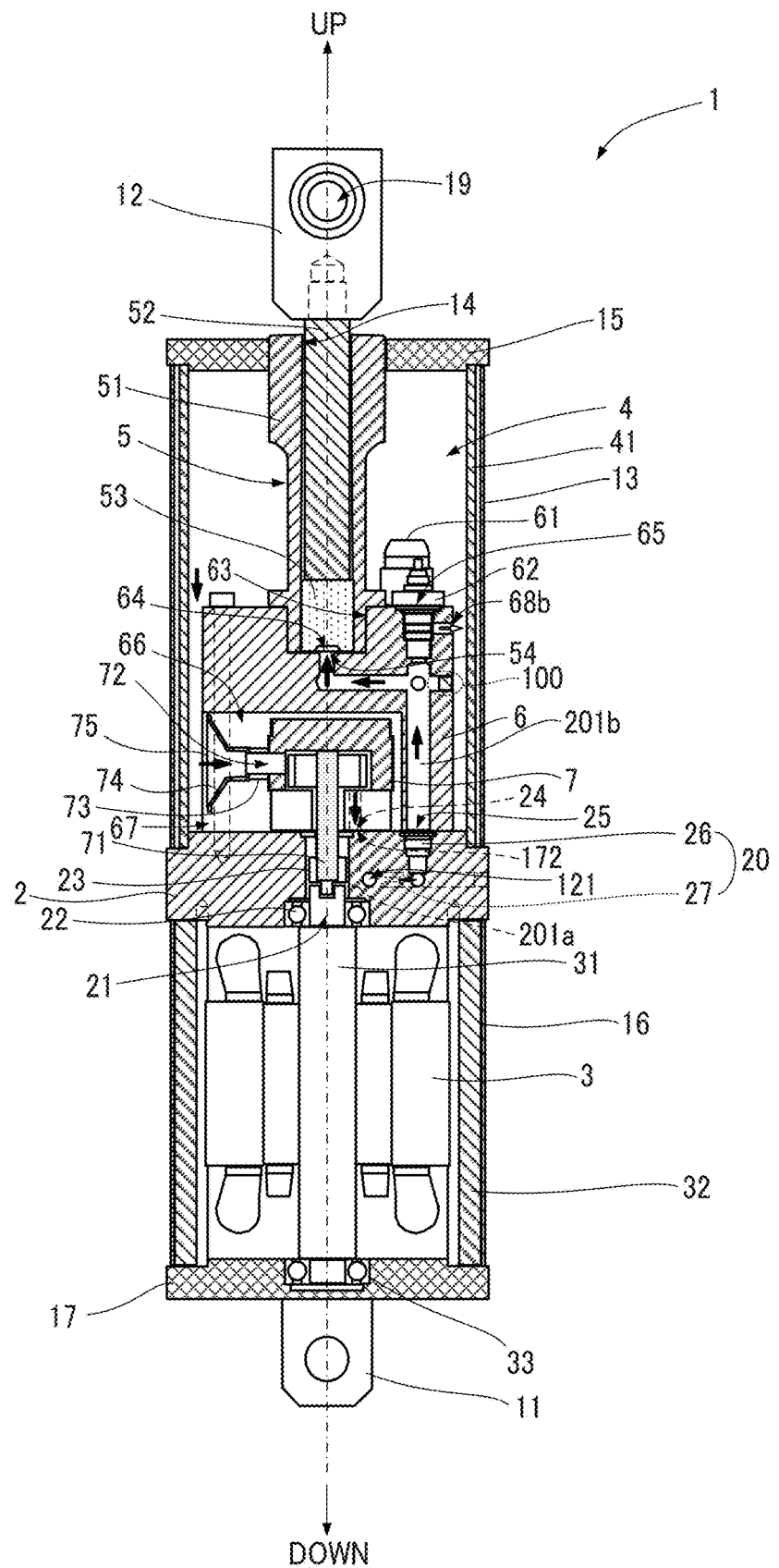
FIG. 2 is a cross-sectional view along line aa in FIG. 1A, illustrating the internal structure of the electro-hydraulic actuator according to the embodiment.

The internal structure of the thruster 1 is shown in FIG. 2. FIG. 2 is a cross-sectional view along the line aa in FIG. 1A. In FIG. 2, a part of the thruster 1 is shown by hatching so that the internal structure of the thruster 1 can be easily understood. Below, the configuration and structure of the thruster 1 is described with reference to FIG. 2.

The motor 3 is disposed within the lower housing and is covered by a hollow cylindrical motor case 32. The motor shaft 31 has a rotation axis in the vertical direction and protrudes upward from the motor case 32. The lower end of the motor shaft 31 is supported by a bearing 33 using ball bearings provided on the base plate 17.

A hole (hereinafter sometimes referred to as "communication hole 21") that connects the upper surface and the lower surface is formed in the connecting block 2, and the upper end side of the motor shaft 31 is inserted into this communication hole 21. A bearing 22 for the motor shaft 31 using ball bearings is incorporated inside the connecting block 2, and part of the flow path included in the hydraulic circuit is also formed.

In the present embodiment, the pump 7 is an external gear pump, and the end of the motor shaft 31 is connected to the end of the drive shaft 71 of the pump through a connecting member 23 in the connecting block 2. In this manner, the connecting block 2 functions to connect the structures above and below it. Note that the flow paths in the connecting block 2 and manifold block 6 are formed by forming holes (hereinafter sometimes referred to as "machined holes") from the outside of a solid metal block, as exemplified in the dotted elliptical region 100 in FIG. 2, and sealing the openings of the machined holes with plugs.

The upper and lower ends of a hollow cylindrical reservoir case 41 housed in the upper housing are in contact with the upper surface of the connecting block 2 and the lower surface of the upper cover plate 15 and are sealed by O-rings or the like, thereby forming a reservoir 4 consisting of an enclosed space.

A cylindrical manifold block 6 arranged in the reservoir 4 is attached to the connecting block 2, and a flow path for hydraulic oil and a storage space 66 for the pump 7 are formed inside. A circular recess 63 into which the lower end of a single-body hydraulic cylinder 5 is inserted is formed on the upper surface of the manifold block 6. An opening (hereinafter sometimes referred to as a "recess opening 64") that communicates with the internal flow path is formed at the bottom of this recess 63, and a port 54 that allows hydraulic oil to flow in and out through this recess opening 64 is provided at the lower end of the cylinder tube 51 of the hydraulic cylinder 5. In addition, an opening 65 that communicates with the internal flow path and to which valves (61, 62) are attached is formed on the upper surface of the manifold block 6. In addition, openings (hereinafter sometimes referred to as "exhaust ports") for returning the hydraulic oil in the flow path to the reservoir 4 is formed on an appropriate surface of the manifold block 6. In the thruster 1 according to the first embodiment, exhaust ports (FIG. 1B, reference numerals 69a, 69b) corresponding to each of the valves (61, 62) are formed on the side surface of the manifold block 6. When the valves (61, 62) are attached to the manifold block 6, the valve mechanisms of the valves (61, 62) are arranged so as to be disposed within predetermined flow paths within the manifold block 6.

A cylindrically hollowed-out storage space 66 for the pump 7 is formed on the underside of the manifold block 6. The pump 7 is attached to the connecting block 2 and disposed in the storage space 66. The pump 7 has an intake port 72 for hydraulic oil opening on the side perpendicular to the up-down direction, and a bell mouth 74 is attached to this opening via a coupling pipe 73. A suction filter 75 for filtering foreign matter in the hydraulic oil is attached to the open end of the bell mouth 74. An opening 67 cut into a rectangular shape is formed on the side of the cylindrical manifold block 6. This opening 67 communicates with the storage space 66 for the pump 7, and exposes the bell mouth 74 of the pump 7 to the outside of the manifold block 6 in the reservoir 4.

Figure 3A:
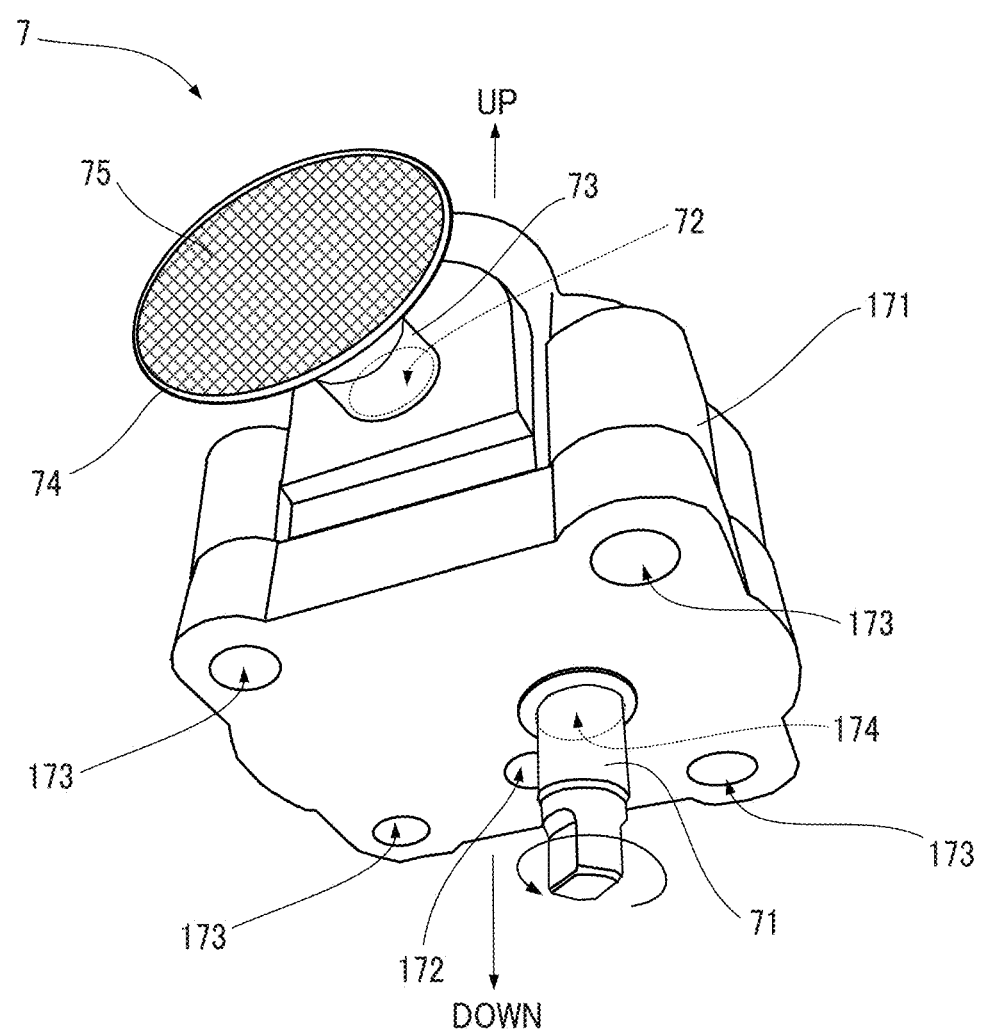
FIG. 3A is a diagram illustrating the external appearance of a pump constituting an electro-hydraulic actuator according to the embodiment.
Figure 3B:
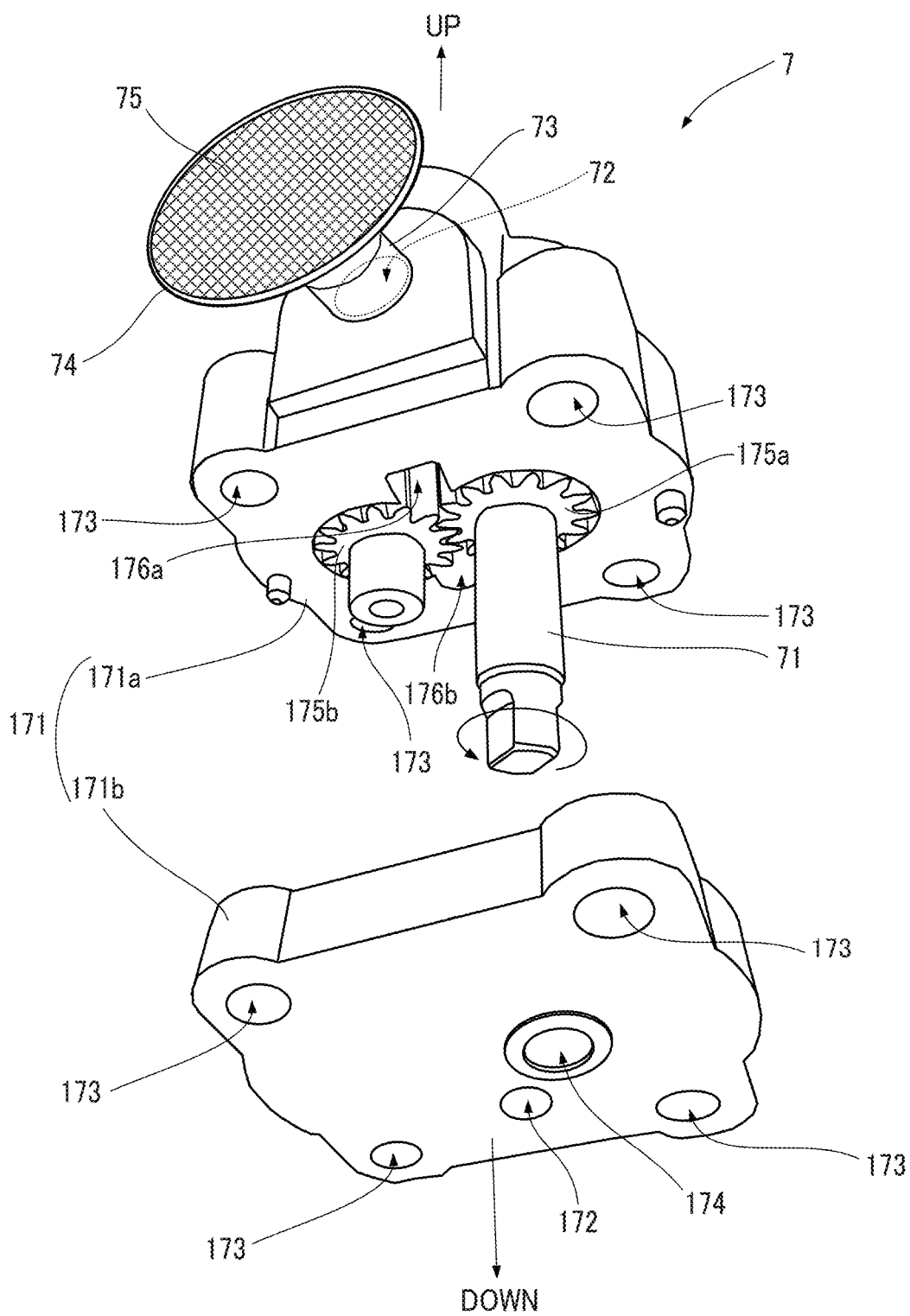
FIG. 3B is a diagram illustrating the internal structure of a pump constituting an electro-hydraulic actuator according to the embodiment.

The structure of the pump 7 is shown in FIGS. 3A and 3B. FIG. 3A is a diagram illustrating the external appearance of the pump 7, and FIG. 3B is a diagram illustrating the internal structure of the pump 7. As shown in FIG. 3A, the drive shaft 71 of the pump 7 protrudes downward through a shaft hole 174 formed in the bottom surface of a housing (hereinafter, sometimes referred to as "pump case 171"). In addition, a discharge port 172 for hydraulic oil is opened in the bottom surface of the pump case 171. Furthermore, the pump case 171 is also formed with an insertion hole 173 for a bolt that penetrates in the vertical direction and attaches the pump case 171 to the connecting block 2.

As shown in FIG. 3B, the pump case 171 is composed of a case body 171a in which storage space for gears (175a, 175b) is formed, and a cover portion 171b covering the underside of case body 171a. The case body 171a and the cover portion 171b are integrally assembled into a single unit with bolts or the like.

A gear (hereinafter, drive gear 175a) that supports the drive shaft 71 and a gear (hereinafter, driven gear 175b) that meshes with the drive gear 175a are built into the case body 171a. In an area where the drive gear 175a and the driven gear 175b mesh, a pressure chamber (hereinafter, sometimes referred to as "intake side pressure chamber 176a") that communicates with the intake port 72 and a pressure chamber (hereinafter, sometimes referred to as "discharge side pressure chamber 176b") that communicates with the discharge port 172 formed. When are drive gear 175a rotates counterclockwise as viewed from below, pump 7 sends hydraulic oil fed from the intake port 72 to the intake side pressure chamber 176a, and discharges hydraulic oil from the discharge port 172 via the discharge side pressure chamber 176b.

Returning to FIG. 2, in the thruster 1, the pump 7 is fixed to the upper surface of the connecting block 2 by bolts (not shown). On the upper surface of the connecting block 2, at a position corresponding to the discharge port 172 of the pump 7, an inlet 24 for hydraulic oil, which is one end of a flow path formed inside the connecting block 2, opens. The other end of the flow path opens as an outlet 25 for hydraulic oil on the upper surface of the connecting block 2. When the manifold block 6 is attached to the connecting block 2, the inlet 25 for hydraulic oil on the manifold block 6 corresponds to the position of the outlet 25 on the connecting block 2, and the flow path in the connecting block 2 and the flow path in the manifold block 6 are connected. A check valve (hereinafter sometimes referred to as "check valve 26") is attached to the outlet 25 for hydraulic oil on the connecting block 2 so that the hydraulic oil discharged from the pump 7 does not flow back from the flow path on the manifold block 6 side to the flow path on the connecting block 2 side. The basic configuration of the thruster 1 described above is almost the same as that of the electro-hydraulic actuator described in the above-mentioned Patent Document 3, but the hydraulic circuit of the thruster 1 according to the embodiment does not have a solenoid valve, and the operation of the hydraulic cylinder is controlled using a valve mechanism that operates by hydraulic pressure. The only electrically-driven component provided in the thruster 1 is the motor 3. The configuration of the hydraulic circuit provided in the thruster 1 according to the embodiment and the operation of the thruster by this hydraulic circuit are described below.

Hydraulic Circuit Configuration

Figure 4:
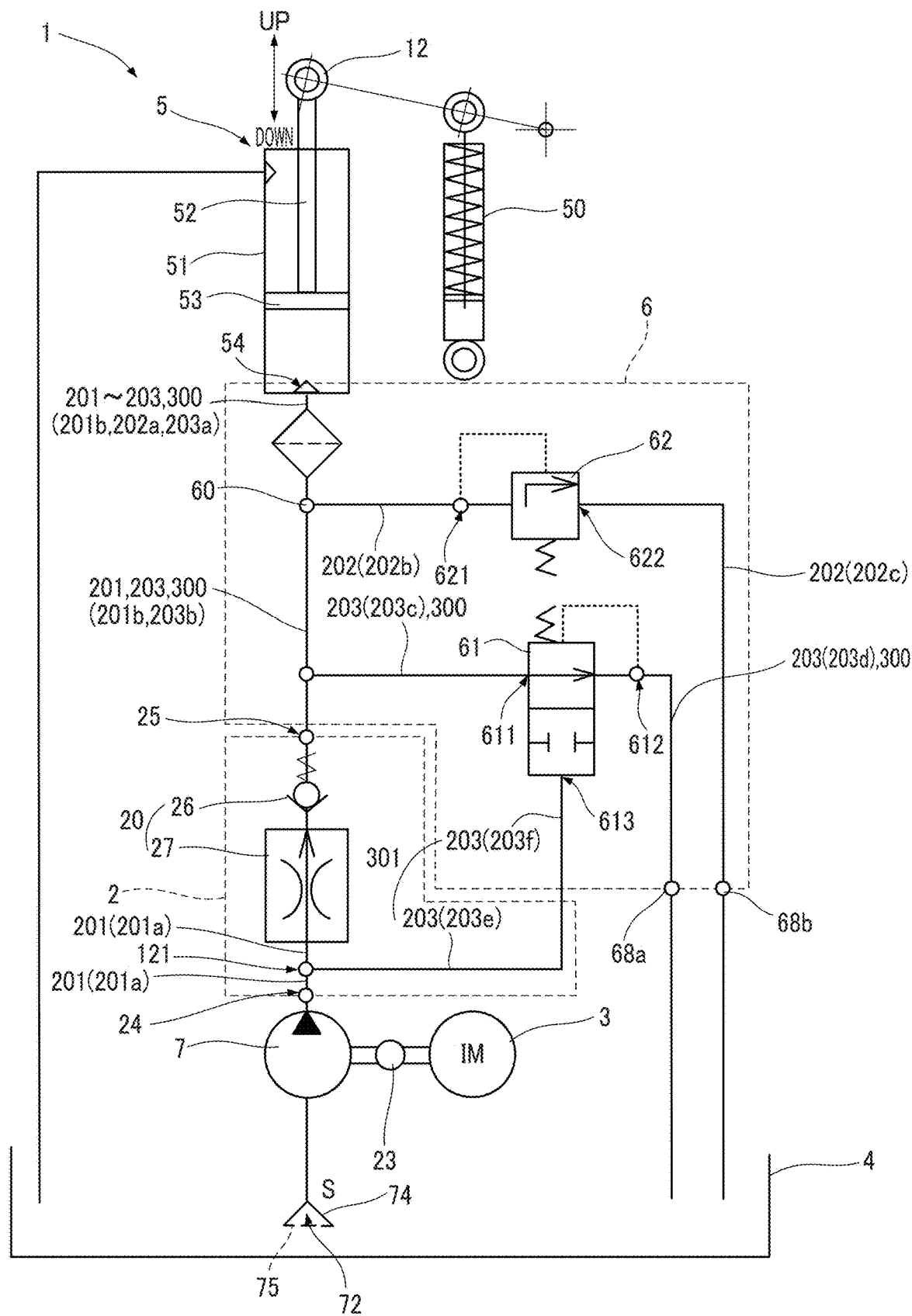
FIG. 4 is a diagram illustrating a hydraulic circuit of an electro-hydraulic actuator according to the embodiment.

A hydraulic circuit diagram of the thruster 1 according to the embodiment is shown in FIG. 4. As shown in FIG. 4, the hydraulic circuit has a flow path (hereinafter sometimes referred to as "pressurizing flow path 201") that guides hydraulic oil pressurized by the pump 7 to the port 54 of the cylinder tube 51 in order to push up the piston 53, a flow path (hereinafter sometimes referred to as "pressure adjustment flow path 202") that adjusts the hydraulic pressure inside the cylinder tube 51 to a predetermined pressure (e.g., 50 bar) while maintaining the piston 53 at top dead center, and a flow path (hereinafter sometimes referred to as "pressure reduction flow path 203") that forcibly discharges the hydraulic oil in the cylinder tube 51 pressurized by the pump 7 toward the reservoir 4. In the thruster 1 according to the embodiment, the piston 53 is always biased downward by an external mechanism connected to the head 12 at the tip of the piston rod 52 or a biasing mechanism 50 such as a spring attached to the thruster 1.

In the present embodiment, the pressure adjustment flow path 202 is composed of a flow path 202a from the port 54 of the cylinder tube 51 to a branch point 60 to the relief valve 62, which also serves as a part of the pressurization flow path 201; a flow path 202b from the branch point 60 to the relief valve 62; and a flow path 203c from the relief valve 62 to the reservoir 4. As shown in FIG. 1B and FIG. 2, the main body of the relief valve 62 is attached to the manifold block 6. The relief valve 62 has a primary port 621 to which hydraulic oil is input and a secondary port 622 from which the input hydraulic oil is discharged. The primary port 621 is connected to the port 54 side of the cylinder tube 51 and the secondary port 622 is connected to the reservoir 4.

The pressure reducing flow path 203 is a flow path for returning the hydraulic oil in the cylinder tube 51 to the reservoir 4 via the unloading valve 61. The unloading valve 61 used in the hydraulic circuit of the thruster 1 according to the embodiment operates to close the flow path between the primary port 611 into which the hydraulic oil flows from the port 54 of the cylinder tube 51 and the secondary port 612 which serves as an outlet for the hydraulic oil that has flowed into the primary port 611 when the hydraulic oil flowing into a pilot port 613 reaches a predetermined hydraulic pressure (e.g., 5 bar) or more. The unloading valve 61 opens and closes the flow path between the primary port 611 and the secondary port 612 according to the hydraulic pressure of the hydraulic oil flowing into the pilot port 613.

Figure 5A:
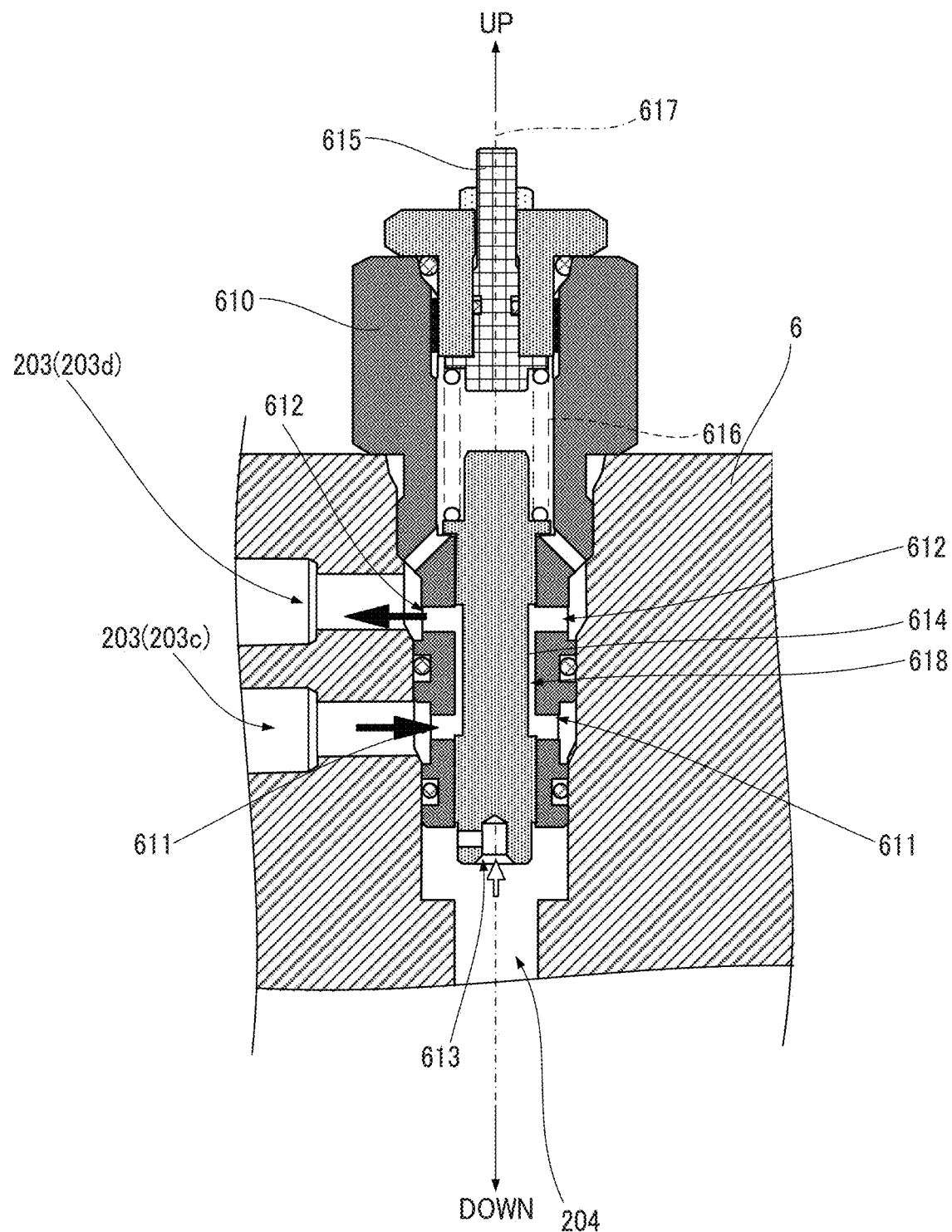
FIG. 5A is a diagram illustrating a schematic structure of an unloading valve that constitutes the hydraulic circuit, illustrating a state in which an internal flow path of the unloading valve is open.
Figure 5B:
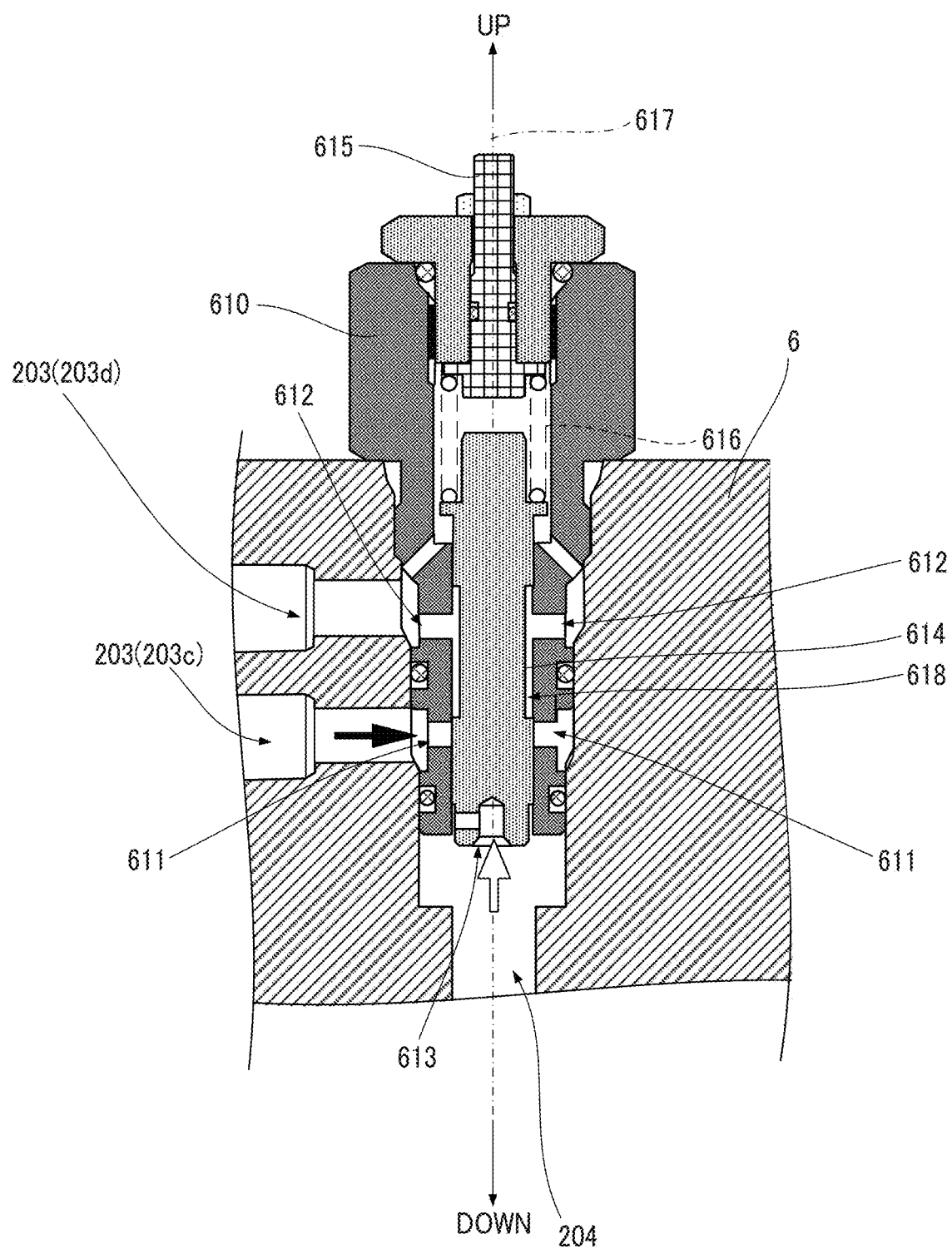
FIG. 5B is a diagram illustrating a schematic structure of an unloading valve that constitutes the hydraulic circuit, illustrating a state in which the internal flow path of the unloading valve is closed.

The schematic structure of the unloading valve is shown in FIGS. 5A and 5B. FIGS. 5A and 5B show the unloading valve 61 installed in the manifold block 6, with FIG. 5A illustrating an unloaded state in which the flow path between the primary port 611 and the secondary port 612 (hereinafter sometimes referred to as the "internal flow path") is open, and FIG. 5B illustrating a loaded state in which the internal flow path is closed.

As shown in FIGS. 5A and 5B, the unloading valve 61 is configured such that a cylindrical valve body 614 that can slide in a liquid-tight state in the direction of a cylinder axis 617 is housed in a hollow cylindrical housing 610. The primary port 611 and the secondary port 612 that open on the side of the housing 610 communicate with the inside of the hollow housing 610. The pilot port 613 opens on one end face of the hollow cylindrical housing 610. A female thread is formed on the inside of the other end face side. A hydraulic pressure (indicated by a white arrow in the figure) for controlling the opening and closing of the internal flow path is applied to the pilot port 613, and a pressure adjusting screw 615 for adjusting the hydraulic pressure (hereinafter sometimes referred to as "pilot pressure") required to close the internal flow path is screwed into the female the thread. More specifically, if the direction of t cylinder shaft 617 is defined as the up-down direction and the pilot port 613 is provided at the lower end of the housing 610, and the up-down directions of the unloading valve 61 are defined, a spring 616 is disposed between the lower end of the pressure adjusting screw 615 and the upper end of the cylindrical valve body 614, and the pilot pressure can be adjusted by adjusting the extent of screwing of the pressure adjusting screw 615. Of course, an unloading valve in which the pilot pressure is fixed so that it cannot be varied may be used.

A wide groove 618 is formed on the side of the cylindrical valve body 614, circling the cylinder axis 617 and extending in the direction of the cylinder axis 617. As a result, the side of the valve body 614 is separated from the inner surface of the housing 610 in the region where the groove 618 is formed, and the side of the valve body 614 is in close contact with the inner surface of the housing 610 outside the region where the groove 618 is formed. When the hydraulic pressure in the pilot port 613 is lower than the pilot pressure, as shown in FIG. 5A, the valve body 614 moves downward due to the biasing force of the spring 616 interposed between the pressure adjusting screw 615 and the valve body 614, such that the wide groove 618 is positioned to straddle the primary port 611 and the secondary port 612 and the internal flow path between the primary port 611 and the secondary port 612 is opened. As a result, as shown by the solid black arrow in FIG. 5A, the hydraulic oil in the cylinder tube 51 is discharged through the unloading valve 61 toward the reservoir 4.

On the other hand, when the oil pressure at pilot port 613 is equal to or higher than the pilot pressure, as shown in FIG. 5B, valve body 614 moves upward against the biasing force of spring 616, and the side of valve body 614 outside the formation area of groove 618 comes into close contact with the inner surface of housing 610 in the area including the opening area of secondary port 612, thereby closing the internal flow path.

In the present embodiment, the main body of the unloading valve 61 is attached to the manifold block 6, and in the manifold block 6 are formed a flow path (203a to 203c) from the hydraulic cylinder 5 to the primary port 611 of the unloading valve 61, and a flow path 203d from the secondary port 612 to the reservoir 4, which are part of the pressure reduction flow path 203. In addition, as part of the pressure reduction flow path 203, a flow path 203f is formed which is connected to a flow path 203e formed in the connecting block 2 and which continues to the pilot port 613. In the following, in the pressure reduction flow path 203, the flow paths (203a to 203d) from the port 54 of the hydraulic cylinder 5 to the reservoir 4 via the internal flow path of the unloading valve 61 are referred to as discharge flow path 300, and the flow paths (203e, 203f) from the pump 7 to the pilot port 613 of the unloading valve 61 are referred to as pilot flow path 301.

The pressurizing flow path 201 is composed of a flow path 201a that runs from the inlet 24 in the connecting block 2 through the check valve 26 to the outlet 25, and a flow path 201b that is connected to the outlet 25 in the manifold block 6 and runs to the port 54 of the hydraulic cylinder 5. A throttle mechanism 27 for adjusting the flow rate of hydraulic oil and a check valve 26 for preventing backflow of hydraulic oil from the hydraulic cylinder 5 and for allowing hydraulic oil to pass only in the forward direction are arranged, in that order, along the flow path 201a in the connecting block 2 in the forward direction from the pump 7 to the port 54. In the present embodiment, the throttle mechanism 27 is an orifice that is a fixed throttle, and this throttle mechanism 27 functions as a mechanism for generating pilot pressure (hereinafter, sometimes referred to as a pilot pressure generating mechanism 20).

In the pressurizing flow path 201a in the connecting block 2, the flow path from the pump 7 to the throttle mechanism 27 branches off at a branch point 121, and the branched flow path 203e in the connecting block 2 and the flow path 203f connected to the flow path 203e and leading to the pilot port 613 of the unloading valve 61 in the manifold block 6 become the above-mentioned pilot flow path 301.

Thruster Operation

Next, the operation of the thruster 1 according to the embodiment is described. Here, the state in which the piston 53 of the hydraulic cylinder 5 is at bottom dead center in the thruster 1 is referred to as the first operating state, and the state in which the piston 53 is at top dead center is referred to as the second operating state. Below, the operation of the thruster 1 from the first operating state to the second operating state by turning on the power and then turning off the power to return to the first operating state is described with reference to FIGS. 2 and 4.

In the thruster 1 according to the embodiment, when power is applied, the motor 3 is driven to operate the pump 7. The pump 7 continues to operate while power is being supplied. When the pump 7 is in operation, the hydraulic oil in the reservoir 4 continues to be discharged toward the pressurizing flow path 201. The hydraulic oil discharged from the pump 7 is guided to the pilot port 613 of the unloading valve 61 via the pilot flow path 301, and the throttle mechanism 27 pressurizes the hydraulic oil filled in the pilot flow path 301 to the pilot pressure, which closes the internal flow path of the unloading valve 61. As shown by the solid black arrows in FIG. 2, the hydraulic oil pressurized to the pilot pressure passes through the throttle mechanism 27 and the check valve 26 of the pressurizing flow path 201 toward the port 54 of the hydraulic cylinder 5 and is supplied into the cylinder tube 51.

Since the hydraulic oil flowing toward the port 54 through the check valve 26 does not flow back toward the pump 7, as the pump 7 continues to operate, the hydraulic oil fills the cylinder tube 51 and increases the hydraulic pressure in the cylinder tube 51. As a result, the piston 53 at bottom dead center is pushed up against the biasing mechanism 50 by an external mechanism or the like. That is, the thruster 1 in the first operating state operates toward the second operating state. As long as power is supplied to the pump 7, the pump 7 continues to operate even after the piston 53 reaches top dead center, so that the cylinder tube 51 continues to be pressurized even after the thruster 1 transitions to the second operating state. When the hydraulic oil pressure in the cylinder tube 51 becomes higher than the hydraulic oil pressure set in the relief valve 62, a flow path (hereinafter sometimes referred to as an "internal flow path") is formed between the primary port 621 and the secondary port 622 of the relief valve 62, and the hydraulic oil flowing from the pump 7 toward the port 54 is returned to the reservoir 4 from the discharge port 68b via the relief valve 62. As a result, the pressure inside the cylinder tube 51 is adjusted to the pressure set in the relief valve 62, and the thruster 1 maintains the second operating state.

If the power is turned off at this point, the motor 3 stops and the operation of pressurizing the hydraulic oil by the pump 7 also stops. The hydraulic pressure in the pilot flow path 301 disappears when the pump 7 stops, and at almost the same time, the internal flow path of the unloading valve 61 opens, forming a discharge flow path 300 from the port 54 to the reservoir 4. This causes the hydraulic pressure in the cylinder tube 51 to decrease rapidly. In addition, the piston 53 is pushed downward by the biasing force of the external mechanism and the hydraulic oil in the cylinder tube 51 is quickly returned to the reservoir tank from the discharge port 68a via the discharge flow path 300. In this way, the thruster 1 returns to the first operating state.

In this way, the thruster 1 according to the embodiment can reliably discharge the hydraulic oil in the cylinder tube 51 toward the reservoir 4 and return to the first operating state using only a valve mechanism operated by hydraulic pressure. In addition, since the valve mechanism does not require electric power, it is energy efficient. In addition, a valve mechanism that does not require a power source is less likely to generate heat even when operated continuously or frequently, and the viscosity of the hydraulic oil does not decrease. Furthermore, if a brake device that is equipped with the thruster 1 according to the embodiment and is in a braking state in the first operating state is equipped with the thruster 1 according to the embodiment, the brake device quickly enters the braking state as the thruster 1 returns to the first operating state in the event of a power outage. As a result, even if a power outage occurs during the operation of some movable device that is the subject of the brake device, such as a crane, the movable device does not continue to operate due to inertia and quickly stops. In other words, the brake device equipped with the thruster 1 according to the embodiment is extremely safe. Of course, there is no malfunction of the thruster 1 due to external electromagnetic interference.

Modified Hydraulic Circuits

The hydraulic circuit of the thruster 1 according to the embodiment is not limited to that shown in FIG. 4 and can be modified as appropriate according to the specifications and usage of the thruster 1, the performance required of the thruster 1, etc. In the following, hydraulic circuits according to the following first and second variations are given as modifications of the hydraulic circuit of the thruster 1 according to the embodiment.

First Variation

In the hydraulic circuit of the thruster 1 according to the embodiment, stopping the pump 7 sets the pilot pressure to zero and opens the discharge flow path 300 via the unloading valve 61. Note that, in the above hydraulic circuit, depending on the type and mechanism of the pump 7, the timing at which the discharge flow path 300 opens may be slightly delayed with respect to the timing at which the pump 7 is stopped due to residual pressure of the hydraulic oil remaining in the flow path from the pump 7 to the check valve 26 when the pump 7 is stopped.

For example, if the pump 7 is an impeller pump using rotors, it is likely to operate in the opposite direction to pressurization even if there is residual pressure, and therefore the pilot pressure will become zero more quickly when the pump 7 is stopped. On the other hand, if the pump 7 is an internal gear pump or an external gear pump as in the embodiment, there is a possibility that the elimination of the residual pressure will be slightly delayed.

Figure 6:
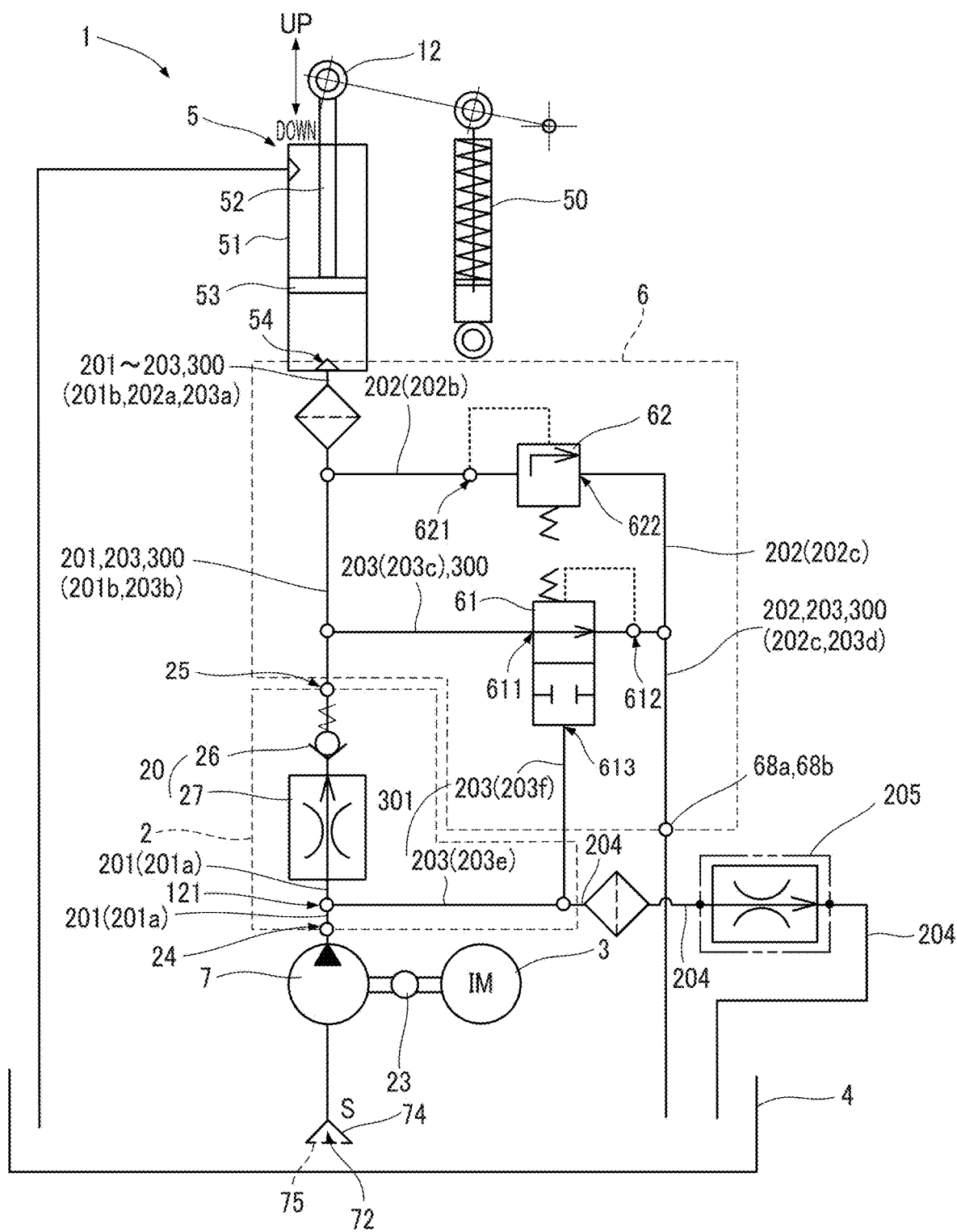
FIG. 6 is a diagram illustrating a first variation of a hydraulic circuit of the electro-hydraulic actuator according to the embodiment.

Therefore, as in the hydraulic circuit illustrated in FIG. 6, a flow path 204 is provided that branches off from the pilot flow path 301 and leads to the reservoir 4 via a throttle mechanism 205 such as an orifice, and the flow path resistance of the throttle mechanism 205 disposed within the flow path 204 is made much higher than the flow path resistance of the throttle mechanism 27 in the pressurizing flow path 201. For example, if the load pressure of the hydraulic cylinder 5 during operation of the pump 7 is 20 Bar and the pilot pressure is 5 Bar, the differential pressure of the added throttle mechanism 205 becomes 20 Bar, which is the operating pressure of the pressurizing flow path 201. Since the flow path resistance of the added throttle mechanism 205 is made very high, the flow rate of the hydraulic oil discharged from the pump 7 during operation that leaks from the added throttle mechanism 205 to the reservoir 4 is small, and most of the hydraulic oil flows toward the port 54 of the hydraulic cylinder 5 while generating pilot pressure by the pilot pressure generating mechanism 20. As a result, the unloading valve 61 is maintained in a closed state by the pilot pressure in the pilot flow path 301 during operation of the pump 7.

On the other hand, the residual pressure when the pump 7 stops, i.e., the hydraulic pressure due to the hydraulic oil remaining in the flow path from the pump 7 to the check valve 26 in the pressurizing flow path 201 and in the pilot flow path 301, is extremely low, so there is almost no flow path resistance due to the throttle mechanism 205. In other words, the hydraulic oil, which is the source of the residual pressure, easily passes through this throttle mechanism 205, and the residual pressure becomes zero more quickly. Therefore, in the hydraulic circuit shown in FIG. 6, regardless of the type or mechanism of the pump 7, the internal flow path of the unloading valve 61 opens more quickly when the pump 7 stops, and the thruster 1 returns to the first operating state more quickly.

In the hydraulic circuit shown in FIG. 6, the flow path 202c in the pressure adjustment flow path 202, which extends from the relief valve 62 to the reservoir 4, and the flow path 203d in the pressure reduction flow path 203, which extends from the unloading valve 61 to the reservoir 4, join together in the manifold block 6. Alternatively, these flow paths (202c, 203d) may be formed separately, as in the hydraulic circuit shown in FIG. 4.

Second Variation

The thruster 1 according to the embodiment is configured to maintain the second operating state by continuing to operate the pump 7. That is, even after the pump 7 has transitioned to the second operating state, the pump 7 continues to discharge hydraulic oil at a hydraulic pressure required to raise the piston 53 against the biasing force of the spring 50 for returning the hydraulic cylinder 5 to the first operating state. Therefore, in a thruster 1 in which the biasing force of the spring 50 is larger, the motor 3 that drives the pump 7 continues to operate at a high load, and is likely to become hot. This may cause deterioration of the hydraulic oil. Of course, the power consumption of the motor 3 also increases. Therefore, below, as a second variation of the hydraulic circuit in the thruster 1 according to the embodiment, a description is given of a hydraulic circuit that can reduce the power consumption of the motor 3 without applying a high load to the motor 3 even when a hydraulic cylinder 5 requiring a higher hydraulic pressure is used.

Figure 7:
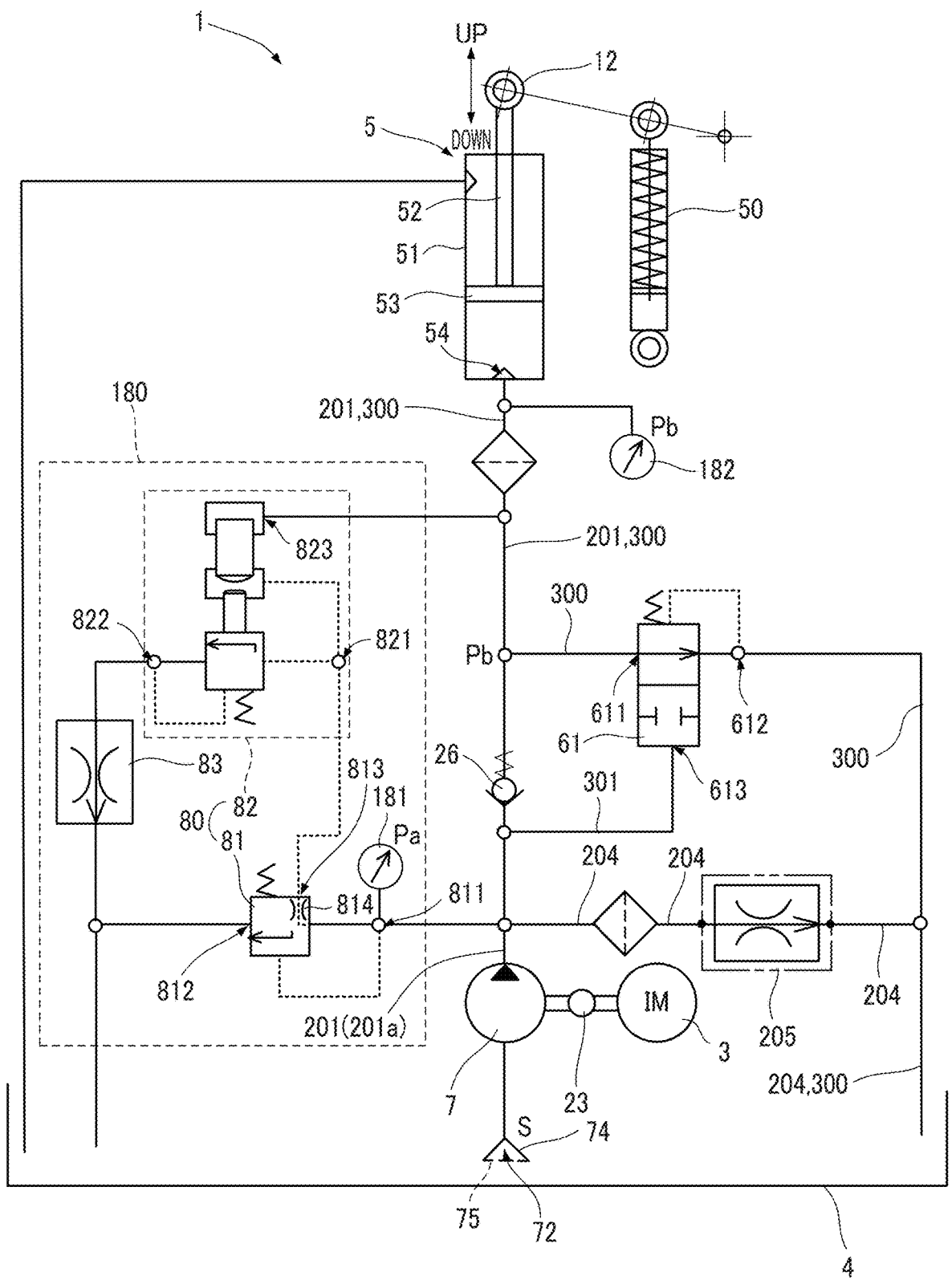
FIG. 7 is a diagram illustrating a second variation of a hydraulic circuit of the electro-hydraulic actuator according to the embodiment.

FIG. 7 shows the second variation of the hydraulic circuit in the thruster 1. The hydraulic circuit shown in FIG. 7 is for explaining the configuration and operation thereof, and so the connecting block 2 and the manifold block 6 related to the mechanical structure are omitted. In the hydraulic circuits of the thruster 1 shown in FIG. 4 and FIG. 6, the pilot pressure generating mechanism 20 is constituted by the throttle mechanism 27 and the check valve 26 connected in series in the pressurizing flow path 201, but in the hydraulic circuit shown in FIG. 7, the pilot pressure generating mechanism 180 is connected in parallel to the pressurizing flow path 201. The pilot pressure generating mechanism 180 is constituted by an unloading relief valve 80 consisting of a parent valve 81 and a child valve 82, and a throttle mechanism 83 consisting of an orifice or the like. In FIG. 7, for the sake of convenience, in order to easily understand the operation of the thruster 1 and the hydraulic pressure at each point in the hydraulic circuit, a hydraulic pressure gauge 181 for measuring the discharge pressure Pa of the pump 7 and a hydraulic pressure gauge 182 for measuring the hydraulic pressure Pb in the flow path from the check valve 26 to the hydraulic cylinder 5 in the pressurizing flow path 201 are included in the hydraulic circuit. In addition, since the hydraulic pressure Pb measured by the hydraulic gauge 182 is substantially the hydraulic pressure inside the hydraulic cylinder 5, hereinafter, the hydraulic pressure Pb may be referred to as the "cylinder pressure Pb".

Figure 8:
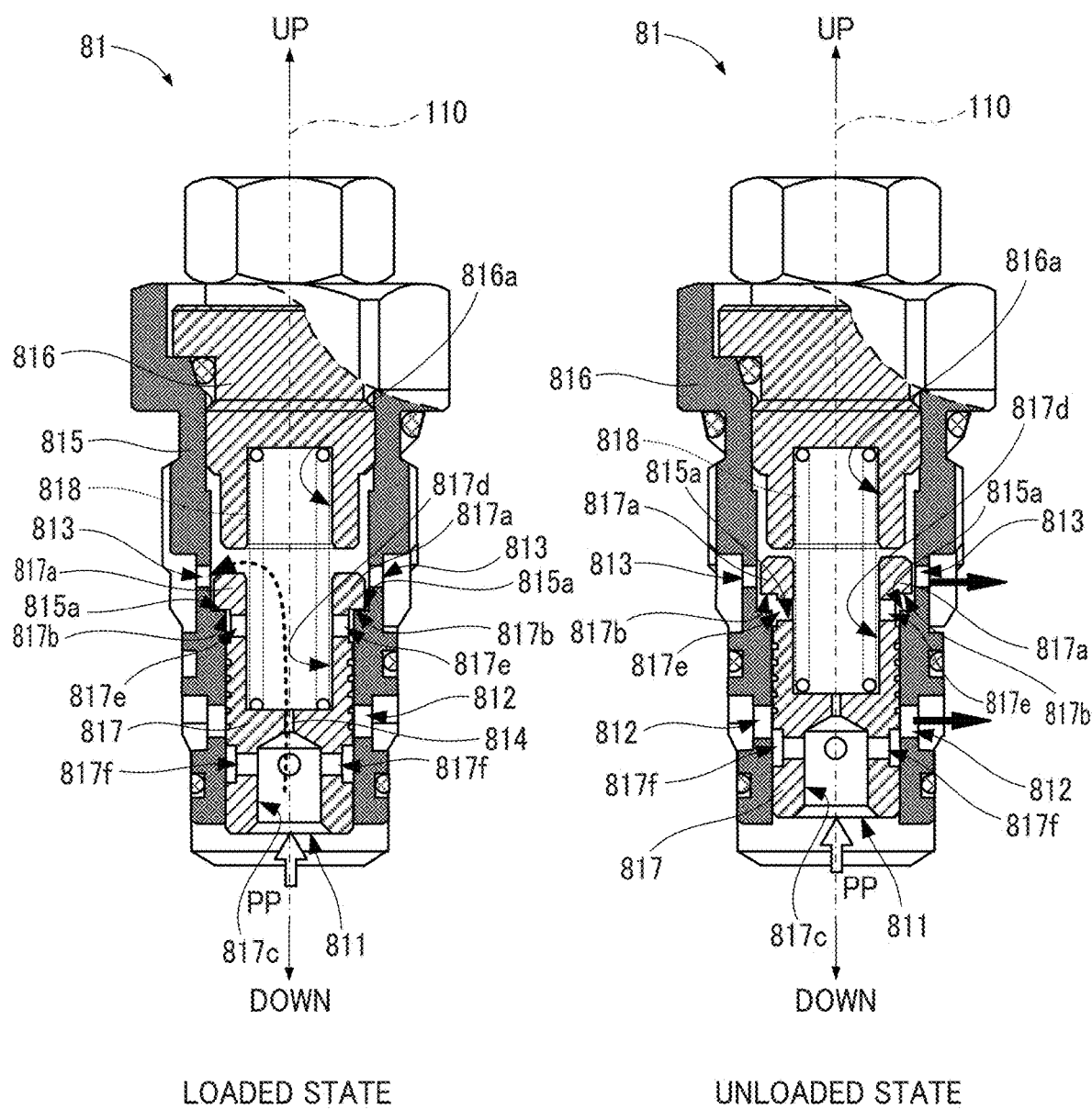
FIG. 8 is a diagram for explaining the operation of a parent valve of an unloading relief valve that constitutes a hydraulic circuit in the second variation.
Figure 9:
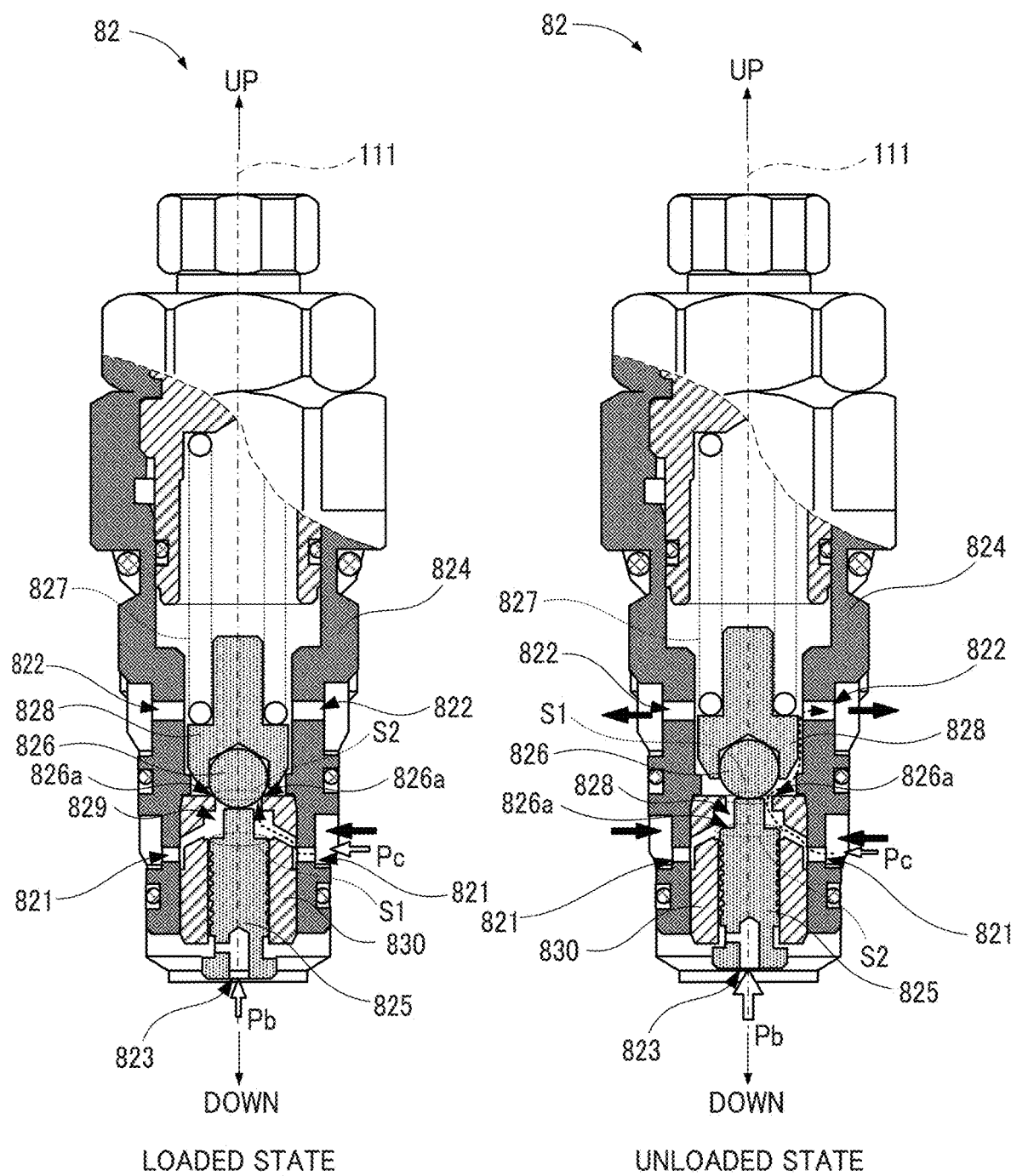
FIG. 9 is a diagram for explaining the operation of a child valve of an unloading relief valve that constitutes a hydraulic circuit in the second variation.

FIG. 8 shows the internal structure of the parent valve 81, and FIG. 9 shows the internal structure of the child valve 82. FIGS. 8 and 9 are diagrams for explaining the operation of the parent valve 81 and child valve 82, with the left side of FIGS. 8 and 9 showing the parent valve 81 and child valve 82 in a loaded state with the internal flow paths between the primary ports (811, 821) and secondary ports (812, 822) closed, and the right side showing the parent valve 81 and child valve 82 in an unloaded state with the internal flow paths open.

As shown in FIG. 8, the parent valve 81 has a primary port 811 and a secondary port 812 which communicate with each other so as to be freely opened and closed by an internal flow path, and a pilot port (hereinafter sometimes referred to as "parent valve pilot port 813") that discharges hydraulic oil that has flowed into the primary port 811 via a built-in throttle valve 814. As shown in FIG. 9, the child valve 82 has a primary port 821 and a secondary port 822 which communicate with each other so as to be freely opened and closed by an internal flow path, and a pilot port (hereinafter sometimes referred to as "child valve pilot port 823") to which hydraulic pressure is applied to control the opening and closing of the internal flow path. In FIGS. 8 and 9, the flow direction of hydraulic oil is indicated by solid black arrows as in FIG. 5A, and the direction of application of hydraulic pressure for opening and closing the valve is indicated by hollow white arrows as in FIG. 5B. As with the unloading valve 61 shown in FIGS. 5A and 5B, the parent valve 81 and the child valve 82 have ports (811-813, 821-823) including ports with multiple 1 openings (812, 813, 821, 822). However, in FIGS. 8 and 9, in order to make it easier to understand the flow paths of hydraulic oil, for ports with multiple openings, the flow direction of hydraulic oil is shown for only one opening.

First, the structure of the parent valve 81 is specifically described. As shown in FIG. 8, the parent valve 81 is provided with a primary port 811 to which a discharge pressure Pa is applied on one end face side of a hollow cylindrical housing 815, and a secondary port 812 communicating with the inside of the hollow cylinder and the parent valve pilot port 813 are opened on the side. A plug 816 is fitted to the other end face side of the housing 815. Here, if the direction of the cylinder axis 110 of the cylindrical housing 815 in the parent valve 81 is defined as the up-down direction, and the up-down directions are defined by assuming that the primary port 811 is provided on the lower end side, then the housing 815 contains a cylindrical spool 817 that slides in the up-down direction and a spring 818 that urges the spool 817 downward with a relatively weak pressure (e.g., equivalent to 5 Bar).

A flange-shaped head 817a is formed at the upper end of the spool 817, and a seat 815a is formed in the housing 815 to support a lower surface 817b of the head 817a, thereby restricting the downward movement of the spool 817. The lower end side of the spool 817 is cylindrical with an outer diameter that closely contacts the inner surface of the housing 815. The diameter is reduced on the way from the lower end to the upper side, and the reduced outer shape is maintained until it reaches the head 817a. Therefore, there is a gap between the side of the cylindrical part of the spool 817 directly below the head 817a and the inner surface of the housing 815. A recess (hereinafter sometimes referred to as "lower recess 817c") with an open lower end is formed below the spool 817, and the opening of the lower recess 817c becomes the primary port 811. The inner surface of the lower recess 817c is formed in a shape in which a cone is connected to the top of a cylinder. Meanwhile, a recess (hereinafter sometimes referred to as "upper recess 817d") having a cylindrical inner surface with an open upper end is formed above spool 817. A recess 816a that is open downward and has a top surface at the top is formed on the lower end side of plug 816, and spring 818 is interposed between the bottom surface of upper recess 817d of the spool 817 and the top surface of the recess 816a of the plug 816.

The cone apex of the lower recess 817c and the lower surface of the upper recess 817d are connected via a throttle valve 814 consisting of a thin tube-shaped flow path (orifice). Furthermore, a flow path (hereinafter sometimes referred to as "upper flow path 817e") that connects to the inside of the upper recess 817d is formed in a cylindrical area with a reduced diameter directly below the head 817a of the spool 817. Furthermore, a flow path (hereinafter sometimes referred to as "lower flow path 817f") that connects to the inside of the lower recess 817c is formed in the lower end area of the side of the spool 817 that is in close contact with the inner surface of the housing 815. The spring 818 is interposed between the lower surface of the plug 816 and the lower surface of the upper recess 817d of the spool 817.

Next, the structure of the child valve 82 is described. As shown in FIG. 9, the child valve 82 has a hollow cylindrical sleeve 830 inserted into one end of a hollow cylindrical housing 824, and a cylindrical spool 825 that slides in the direction of the cylindrical axis 111 inserted into the sleeve 830. The housing 824 contains a ball valve 826 that opens and closes as the spool 825 slides, and a ball holder 828 that holds the ball valve 826 and biases it in a direction to return it to a closed state by a spring 827. The side surface of the spool 825 is in close contact with the inner surface of the sleeve 830, and the outer surface of the sleeve 830 is in close contact with the inner surface of the housing 824. Meanwhile, there is a gap between the side surface of the ball holder 828 and the inner surface of the housing 824.

Here, the direction of the cylinder axis 111 of the hollow cylindrical housing 824 of the child valve 82 is defined as the up-down direction, and the up-down direction of the child valve 82 is defined by assuming that the sleeve 830 is inserted into the lower end side of the housing 824. The upper and lower ends of the sleeve 830 are open, and the opening at the upper end is reduced in diameter compared to the opening at the lower end. The edge of the opening of the reduced diameter sleeve becomes a seat portion 826a that is the seat of the ball valve 826. The primary port 821 of the child valve 82 is connected from the housing 824 to a space 829 formed below the seat portion 826a of the ball valve 826 in the sleeve 830. The spool 825 is a two-stage cylindrical shape whose upper end is reduced in diameter compared to the lower end side, and the reduced diameter upper cylindrical portion protrudes into the space 829 and abuts against the ball valve 826. As a result, in the above-mentioned space 829, a filling space for hydraulic oil is formed around the upper cylindrical portion of the spool 825. That is, an opening of the seat portion 826a is formed above the space 829 inside the sleeve 830, and an opening of a hollow portion through which the spool 825 is inserted is formed below.

As shown by the dotted ellipse in FIG. 9, the child valve 82 is such that, in the above-mentioned space 829, the opening area S2 of the seat portion 826a in contact with the ball valve 826 is smaller than the area S1 where the hydraulic pressure acts on the spool 825 in this space 829, that is, the opening area of the lower end side of the sleeve 830 (for example, S2/S1=0.7). Therefore, the force pushing up the ball valve 826 by the hydraulic pressure of the hydraulic oil flowing into the primary port 821 and the force pushing the spool 825 downward are not equal, and the direction pushing up the ball valve 826 is stronger. In the hydraulic circuit according to this variation, the unloading relief valve 80 is constituted by the parent valve 81 and the child valve 82 having the above-mentioned structure and the flow paths connected to these valves (81, 82). Furthermore, the unloading relief valve 80 and the throttle mechanism 83 disposed within the flow path from the secondary port 822 of the child valve 82 to the reservoir 4 constitute a pilot pressure adjustment mechanism 70.

Figure 10:
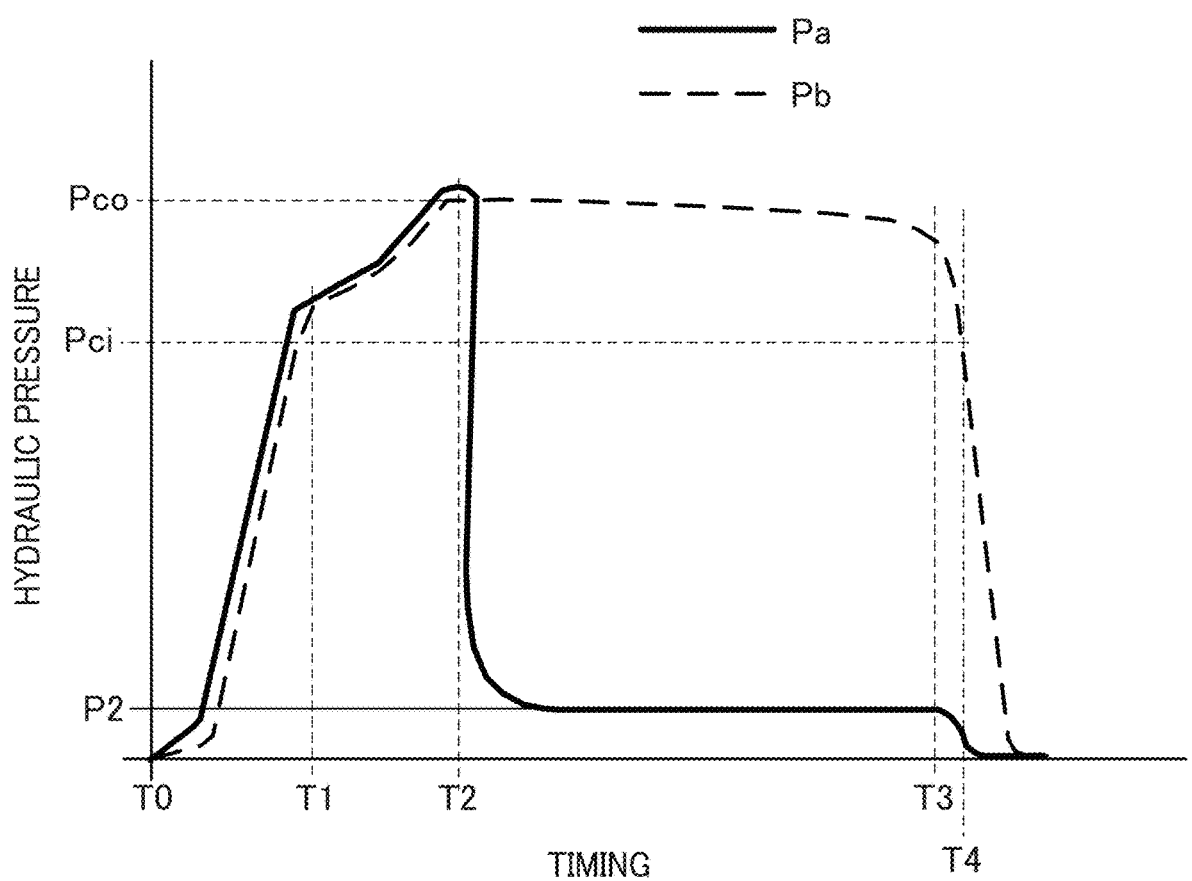
FIG. 10 is a timing chart for explaining the operation of a hydraulic circuit in the second variation.

Next, the operation of the hydraulic circuit in the second variation is described. FIG. 10 shows a timing chart illustrating the changes in the discharge pressure Pa and the cylinder pressure Pb accompanying the operation of the thruster 1. The horizontal axis in the chart of FIG. 10 is the timing (T0 to T3) when the thruster 1 is in a predetermined operating state, and the vertical axis is the hydraulic pressure of the discharge pressure Pa and the cylinder pressure Pb at the predetermined timing. In the chart shown in FIG. 10, power is supplied to the motor 3 at T0 to operate the pump 7, and power to the motor 3 is cut off at T3 to stop the pump 7. Hereinafter, the operation of the hydraulic circuit shown in FIG. 7 is described with reference to FIGS. 8 to 10.

As shown in the hydraulic circuit of FIG. 7, in the pressurizing flow path 201, the primary port 811 of the parent valve 81 is connected to the flow path from the pump 7 to the check valve 26, i.e., the pilot flow path 301. In addition, the parent valve pilot port 813 and the child valve primary port 821 are connected. Therefore, the hydraulic pressure of the hydraulic oil flowing into the primary port 811 of the parent valve 81 becomes the discharge pressure Pa of the pump 7. In addition, the cylinder pressure Pb is applied to the child valve pilot port 823 of the child valve 82. For convenience, the hydraulic pressure applied to the primary port 821 of the child valve 82 is referred to as the child valve control pressure Pc.

First, when the pump 7 is stopped, the discharge pressure Pa is not applied to the primary port 811 of the parent valve 81, so the spool 817 is pushed down by the biasing force of the spring 818, and the lower surface 817b of the head 817a is in contact with the upper surface of the seat 815a formed inside the housing 815. In this state, the upper flow path 827e and the parent valve pilot port 813, and the lower flow path 817f and the secondary port 812, are all in a closed state. On the other hand, the cylinder pressure Pb is not applied to the child valve pilot port 823 of the child valve 82, so the ball valve 826 is maintained in contact with the seat portion 826a by the biasing force of the spring 827, and the primary port 821 and the secondary port 822 are in a closed state.

When the pump 7 operates, the discharge pressure Pa of the pump 7 rises as shown by the solid line in FIG. 10. On the other hand, as shown by the dashed line in FIG. 10, the cylinder pressure Pb rises slightly later than the discharge pressure Pa due to the time lag from the time T0 when the pump 7 starts discharging hydraulic oil to the time when the hydraulic oil is pressurized to the hydraulic pressure (e.g., 5 bar) required to pass through the check valve 26 of the pressurizing flow path 201. Note that when the pump 7 operates, the hydraulic pressure for maintaining the loaded state in the unloading valve 61 is smaller than the hydraulic pressure required to pass through the check valve 26. That is, the unloading valve 61 maintains the loaded state by the hydraulic pressure applied to the pilot port 613 via the pilot flow path 301. As a result, the cylinder pressure Pb rises together with the discharge pressure Pa.

More specifically, when the pump 7 is operated, in the parent valve 81, as shown by the dotted arrow in FIG. 8, the hydraulic oil flows into the upper recess 817d via the throttle valve 814 and is discharged from the parent valve pilot port 813 through the opening on the upper end side of the upper recess 817d. The hydraulic oil discharged from the parent valve pilot port 813 then flows into the primary port of the child valve 82. The throttle valve 814 built into the parent valve 81 reduces the discharge pressure Pa to the same level as the cylinder pressure Pb. In other words, the cylinder pressure Pb is approximately equal to the child valve control pressure Pc.

On the other hand, in the child valve 82, the force of the spring 827 biasing the ball valve 826 downward is stronger than the hydraulic pressure of the hydraulic oil flowing into the primary port 821, so the ball valve 826 remains closed. Therefore, the discharge pressure Pa continues to rise and, in the process of rising, when the piston 53 starts to rise (T1), the rising of the discharge pressure Pa and the cylinder pressure Pb slows down for a while due to the resistance of the spring 50. After that, when the cylinder pressure Pb overcomes the biasing force of the spring 50, the piston 53, which was at bottom dead center, starts to move toward top dead center and the discharge pressure Pa and the cylinder pressure Pb continue to rise.

The discharge pressure Pa and the cylinder pressure Pb continue to rise even after the piston 53 reaches top dead center (for example, Pa=87 Bar, Pb=82 Bar), and reach a maximum value (for example, Pa=90 Bar, Pb=85 Bar) at a certain point (T2). After that, the discharge pressure Pa starts to decrease rapidly, and the cylinder pressure Pb transitions so as to maintain its maximum value. Then, at the point (T2) when the discharge pressure Pa and the cylinder pressure Pb reach their maximum values, the child valve control pressure Pc≈85 Bar pushes the ball valve 826 upward against the biasing force of the spring 818, and as shown by the dotted arrow in FIG. 9, the internal flow path between the primary port 821 and the secondary port 822 is opened via the gap between the ball holder 828 and the inner surface of the housing 824, that is, the unloaded state is reached. When the child valve 82 is in the unloaded state, the child valve control pressure Pc decreases.

Here, assuming that the cylinder pressure Pb is not applied to the child valve pilot port 823, there is a time lag between the increase and decrease of the child valve control pressure Pc and the increase and decrease of the discharge pressure Pa due to the throttle valve 814 of the parent valve 81, so at the moment when the child valve 82 is in the unloaded state and the child valve control pressure Pc decreases, a large pressure difference occurs between the high discharge pressure Pa and the child valve control pressure Pc. Since the child valve control pressure Pc is also a force that tries to push down the spool 817 in the parent valve 81, when the child valve 82 is in the unloaded state, the spool 817 of the parent valve 81 is pushed up by the above pressure difference, the primary port 811 and the secondary port 812 of the parent valve 81 are opened, and the parent valve 81 is also in the unloaded state. However, at the next moment, in the child valve 82, the force pushing down the ball valve 826 by the spring 827 becomes dominant than the reduced child valve control pressure Pc, the ball valve 826 is quickly closed, and the child valve 82 is again in the loaded state. As a result, the child valve control pressure Pc increases, the spool 817 of the parent valve 81 is pushed down, and the parent valve 81 also returns to the loaded state. In other words, when the cylinder pressure Pb is not applied to the child valve pilot port 823, the unloading relief valve 80 functions as a relief valve consisting of the parent valve 81 and the child valve 82.

However, the cylinder pressure Pb is applied to the child valve pilot port 823, and this cylinder pressure Pb is maintained by the check valve 26 disposed within the pressurized flow path 201 and the unloading valve 61 in the loaded state. Therefore, at the moment when the child valve control pressure Pc, which is also the hydraulic pressure in the above-mentioned space 829 inside the child valve 82, begins to decrease, the maximum cylinder pressure Pb is applied to the child valve pilot port 823. Then, in the above-mentioned space 829 where the hydraulic oil contacts the ball valve 826 and the spool 825 inside the sleeve 830 of the child valve 82, as described above, due to the relationship (S1>S2) between the area S1 of the spool 825 and the opening area S2 of the seat portion 826a, the child valve control pressure Pc acts so that the force pushing up the ball valve 826 becomes dominant. Therefore, at the moment when the child valve 82 is in the unloaded state and the child valve control pressure Pc becomes lower than the cylinder pressure Pb, the spool 825 is urged upward and slides due to the pressure difference between the high cylinder pressure Pb applied to the child valve pilot port 823 and the reduced child valve control pressure Pc, and the tip of the spool 825 abuts against the ball valve 826. Then, the force accompanying the upward sliding of the spool 817 acts as a force to further urge the ball valve 826 upward, thus maintaining the child valve 82 in the unloaded state. When the child valve 82 is in the unloaded state, the parent valve 81 is also in the unloaded state as described above. It should be noted that the cylinder pressure Pb when the child valve 82 is maintained in the unloaded state is naturally set to be higher than the cylinder pressure Pb (e.g., Pb=82 Bar) when the piston 53 reaches top dead center and the thruster 1 is in the second operating state. If the child valve control pressure Pc when the child valve 82 transitions to the unloaded state is the cut-out pressure Pco of the unloading relief valve 80 (≈maximum value of Pb), the cylinder pressure Pb at which the unloaded state can no longer be maintained becomes the cut-in pressure Pci.

As described above, in the hydraulic circuit according to the second variation, when the child valve 82 is in the unloaded state due to the child valve control pressure Pc, if the cylinder pressure Pb is greater than the above-mentioned cut-in pressure Pci, both the parent valve 81 and the child valve 82 maintain the unloaded state. Furthermore, in the hydraulic circuit according to the second variation, when the parent valve 81 and the child valve 82 are both in the unloaded state, a hydraulic pressure (e.g., 5 Bar) equivalent to the force of the spring 818 pushing down the spool 817 is applied to the primary port 811 side of the parent valve 81 in the unloaded state. In addition, since the throttle mechanism 83 is disposed within the flow path from the secondary port 822 of the child valve 82 to the reservoir 4, a hydraulic pressure (e.g., 5 Bar) is generated due to the flow path resistance of the throttle mechanism 83, and this hydraulic pressure acts as the child valve control pressure Pc, which pushes down the spool 817 of the parent valve 81. Therefore, in the hydraulic circuit according to the second variation, even if both the parent valve 81 and the child valve 82 continue to be in the unloaded state, the hydraulic oil on the primary port 811 side of the parent valve 81 is maintained at a hydraulic pressure (e.g., 10 Bar) obtained by adding the hydraulic pressure corresponding to the flow path resistance between the primary port 811 and the secondary port 812 in the parent valve 81 to the hydraulic pressure corresponding to the flow path resistance of the throttle mechanism 83 connected to the secondary port 822 side of the child valve 82, as shown in FIG. 10. Then, the hydraulic oil that has passed through the throttle mechanism 83 from the secondary port 822 of the child valve 82 and the hydraulic oil discharged from the secondary port 812 of the parent valve head toward the reservoir 4 and is discharged from the pump 7 again. In other words, if the unloading relief valve 80 is in the unloaded state, the discharge pressure Pa of the pump 7 need be only for maintaining the pilot pressure, and the pump 7 is driven at a low load. On the other hand, the discharge flow path 300 leading to the reservoir 4 via the unloading valve 61 for the hydraulic oil in the hydraulic cylinder 5 is in a closed state, and the hydraulic oil in the pressurizing flow path 201 leading from the pump 7 to the hydraulic cylinder 5 is prevented from flowing back to the pump 7 side by the check valve 26. As a result, the cylinder pressure Pb maintains the hydraulic pressure required to continue the second operating state.

Next, when the power supply to the motor 3 is cut off to stop the pump 7 (T3), the discharge pressure Pa of the pump 7 disappears and the pilot pressure also disappears. As a result, the internal flow path of the unloading valve 61 opens, the hydraulic oil in the hydraulic cylinder 5 is returned to the reservoir 4 via the discharge flow path 300, and the pressure Pb decreases rapidly. Then, in the child valve 82, the hydraulic pressure applied to the child valve pilot port 823 decreases with the decrease in the cylinder pressure Pb, and the force pushing up the spool 825 against the downward biasing force of the spring 827 weakens. When the pressure Pb decreases to the cut-in pressure (for example, 56 Bar) (T4), the spring 827 pushes the spool 825 downward via the ball holder 828 and the ball valve 826. The ball valve 826 abuts against the seat portion 826a, and the internal flow path between the primary port 821 and the secondary port 822 is closed.

Moreover, hydraulic oil in the flow path from the primary port 821 of the child valve 82 through the parent valve pilot port 813 and the primary port 811 of the parent valve 81 to the pump 7 and in the pilot flow path 301 is returned to the reservoir 4 via the throttle mechanism 205 disposed within the flow path 204 connecting the pump 7 and the discharge flow path, in the same way as in the hydraulic circuit according to the first variation shown in FIG. 6. This causes the discharge pressure Pa to disappear more quickly. The above is the operation of the hydraulic circuit in the second variation.

Note that, in an actual hydraulic circuit, since it is not possible to completely prevent leakage of hydraulic oil, the cylinder pressure Pb gradually decreases over time. However, the time for which the second operating state is continued in a general use form of the thruster 1 is shorter than the time from when the thruster 1 reaches the second operating state until the second operating state cannot be maintained due to the decrease in the cylinder pressure Pb over time. Therefore, the problem of the cylinder pressure Pb decreasing over time and the second operating state being unable to be maintained basically does not occur. Of course, the duration of the second operating state can be extended by increasing the seal strength of each part of the hydraulic circuit or increasing the number of sealed parts, so the seal strength of each part and the number of sealed parts can be appropriately determined at the design stage of the hydraulic circuit according to the duration of the second operating state required for the assumed method of use of the thruster 1. By further improving the manufacturing accuracy of the child valve 82, it is also possible to set the cut-in pressure Pci of the child valve 82 to be equal to or higher than the pressure (e.g., 82 bar) when the piston 53 of the hydraulic cylinder 5 reaches top dead center and lower than the cut-out pressure Pco (e.g., 85 bar). Thereby, the second operating state can be maintained regardless of whether or not there is a leakage of hydraulic oil.

In this way, with the hydraulic circuit shown in FIG. 7 including the unloading relief valve 80, which is composed of the parent valve 81 and the child valve 82, and the pilot pressure generating mechanism 180, which is composed of the throttle mechanism 83, the discharge pressure Pa of the pump 7 is automatically adjusted to a low hydraulic pressure that maintains the pilot pressure of the unloading valve 61 when the thruster 1 transitions to the second operating state. As a result, even when the urging force of the spring 50 is strong and it is necessary to increase the cylinder pressure Pb in the second operating state, the load on the motor 3 that drives the pump 7 is reduced, and deterioration of the hydraulic oil due to heat generation by the motor 3 can be suppressed. In addition, the time during which the motor 3 is operated under high load can be shortened, and the power consumption of the motor 3 can be reduced. Furthermore, in a conventional thruster using an electromagnetic valve, power is consumed when the electromagnetic valve is turned on and off. Therefore, the thruster 1 having the hydraulic circuit shown in FIG. 7 has a higher power consumption reduction effect than the conventional thruster when the power of the motor 3 is turned on and off intermittently and frequently.

Parent and Child Valves in Cartridge Form

The hydraulic circuit in the second variation includes an unloading relief valve 80 in which two separate valve mechanisms, a parent valve 81 and a child valve 82, are connected by a flow path. Although the flow path connecting the parent valve 81 and the child valve 82 may be configured using piping, as shown in FIGS. 8 and 9, the parent valve 81 and the child valve 82 are plug-type valves each having a hollow cylindrical housing (815, 824), and are formed into cartridges so as to be replaceably inserted into and removed from a metal block having a flow path formed therein, similar to the manifold block 6 and the connecting block 2, as with the unloading valve 61 shown in FIGS. 5A and 5B. Therefore, the unloading relief valve 80 may be formed as a unit in which the parent valve 81 and the child valve 82 are formed into cartridges and the parent valve 81 and the child valve 82 are incorporated into a metal block having a flow path formed therein.

Figure 11:
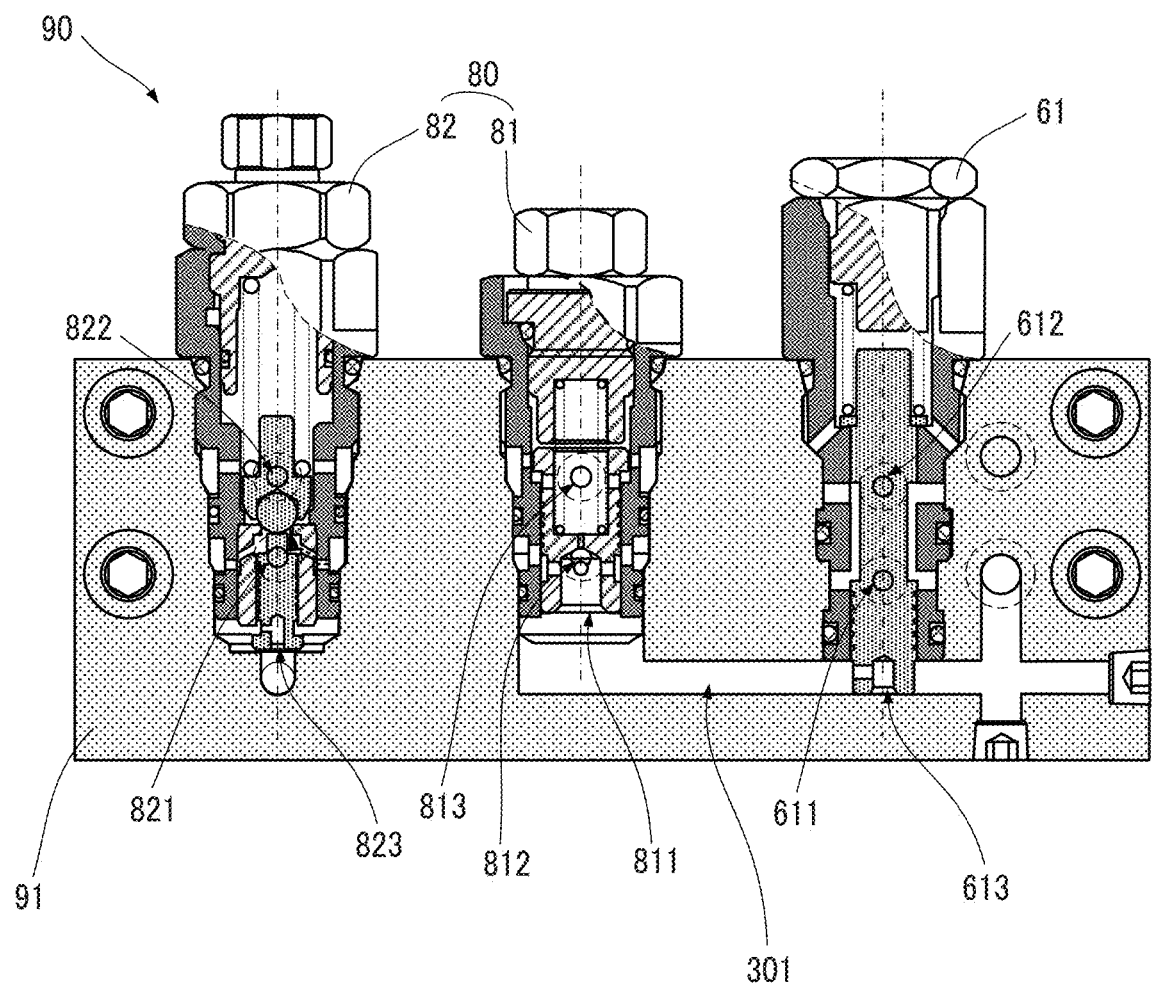
FIG. 11 is a diagram illustrating an unloading relief valve unit in the second variation, in which the parent valve and the child valve formed of a cartridge are attached to a metal block.

FIG. 11 shows a unit 90 of an unloading relief valve 80 in which a parent valve 81 and a child valve 82 are formed as a cartridge. In addition to the parent valve 81 and the child valve 82, the unit 90 shown in FIG. 11 also incorporates an insertable/removable unloading valve 61 and a throttle mechanism 83 (not shown) that constitutes a pilot mechanism 180. The throttle mechanism 83 is fitted into a flow path in a metal block 91, similar to the check valve 26 incorporated into the connecting block 2 of the thruster 1 shown in FIG. 2.

As shown in FIG. 11, the lower end side of each valve (61, 81, 82) is embedded in the metal block 91 so that the ports (611 to 613, 811 to 813, 821 to 823) of each valve are disposed in the metal block 91. In FIG. 11, each valve (61, 81, 82) is shown in cross section so that the embedded state of each valve (61, 81, 82) can be easily understood, but the actual embedded positions of each valve (61, 81, 82) in the front-rear direction of the paper may differ from each other. In addition, in the metal block 91, flow paths such as the pilot flow path 301 are formed to connect predetermined ports of the parent valve 81, the child valve 82, and the unloading valve 61. In addition, the throttle mechanism 83 is inserted in the middle of the flow path connected to the secondary port 822 of the child valve 82. Of course, the metal block 91 constituting the unit 90 may be either the manifold block 6 or the connecting block 2.

In the hydraulic circuit according to the second variation, two valves, a parent valve 81 and a child valve 82, which are linked to each other, are used to realize one function, that of the unloading relief valve 80. When performing maintenance (inspection, replacement, repair, adjustment, etc.) on either the parent valve 81 or the child valve 82, these valves (81, 82) which are made into cartridges can be easily attached and detached individually from the metal block 91. On the other hand, when performing maintenance on the unloading relief valve 80 as a whole, the unit 90 can be removed from the thruster 1. Therefore, by configuring the parent valve 81 and the child valve 82 as cartridges and configuring the unloading relief valve 80 as a unit 90 in which the parent valve 81 and the child valve 82 made into cartridges are attached to a metal block so as to be insertable and detachable, any type of maintenance can be flexibly handled and maintenance costs can be reduced.

OTHER EXAMPLES

The electro-hydraulic actuator according to the present invention has been described above using an electro-hydraulic cylinder (thruster 1) as an embodiment. However, the present invention is not limited to the above example, and various modifications are possible without departing from the gist of the invention. The above embodiment has been described in detail to clearly explain the present invention, and the present invention is not necessarily limited to an actuator having all of the configurations described. In addition, it is possible to add, delete, or replace some of the configurations of the above embodiment with other configurations.

For example, in the hydraulic circuit shown in FIG. 4, outlets (68*a*, 68*b*) corresponding to the unloading valve 61 and the relief valve 62 are provided, respectively. However, the (203*d*, 202*c*) passing through the unloading valve 61 and the relief valve 62, respectively, may join in the manifold block 6 and be discharged from a single outlet into the reservoir 4.

Figure 12:
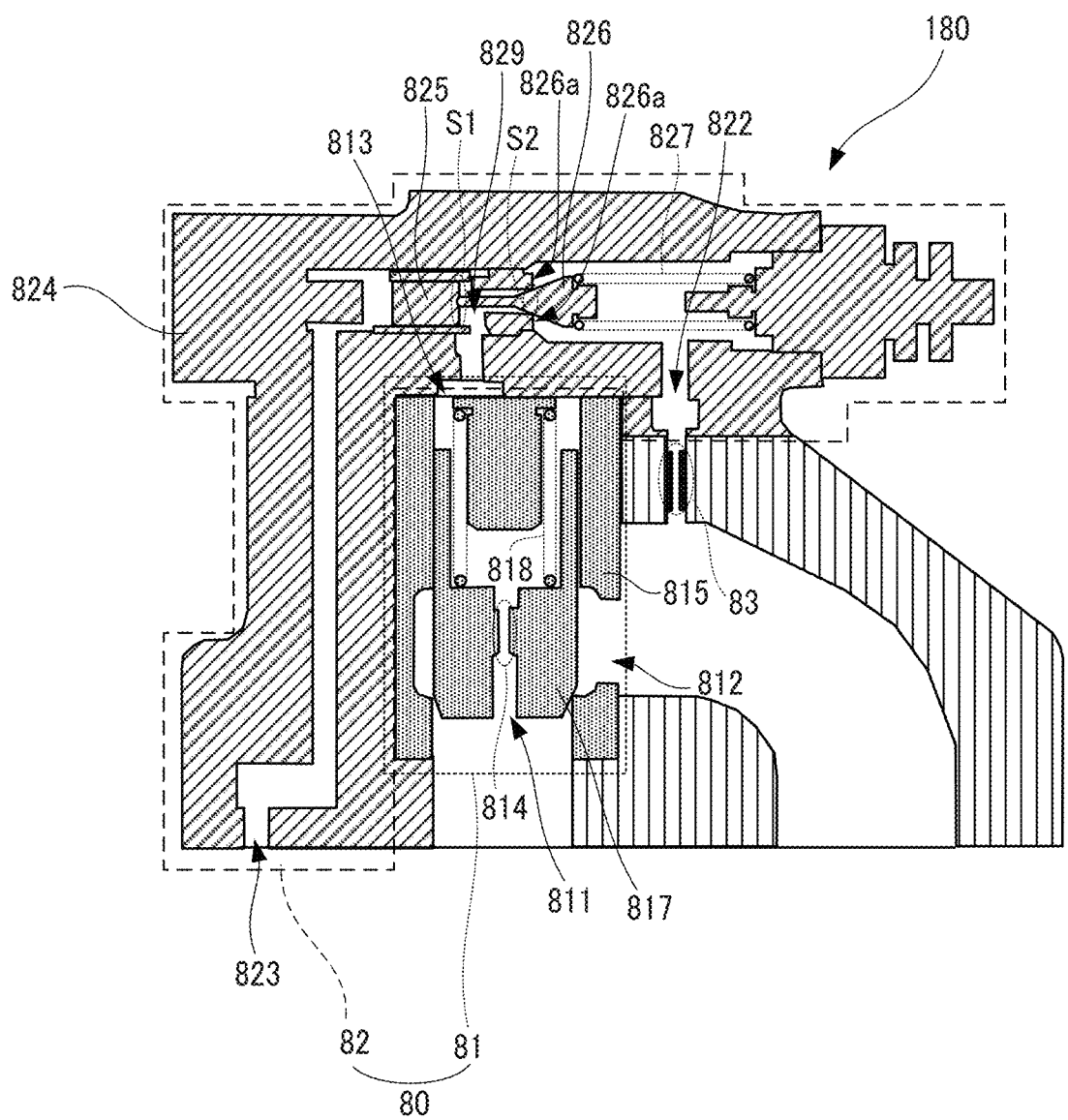
FIG. 12 is a diagram illustrating another example of the unloading relief valve.
Figure 13:
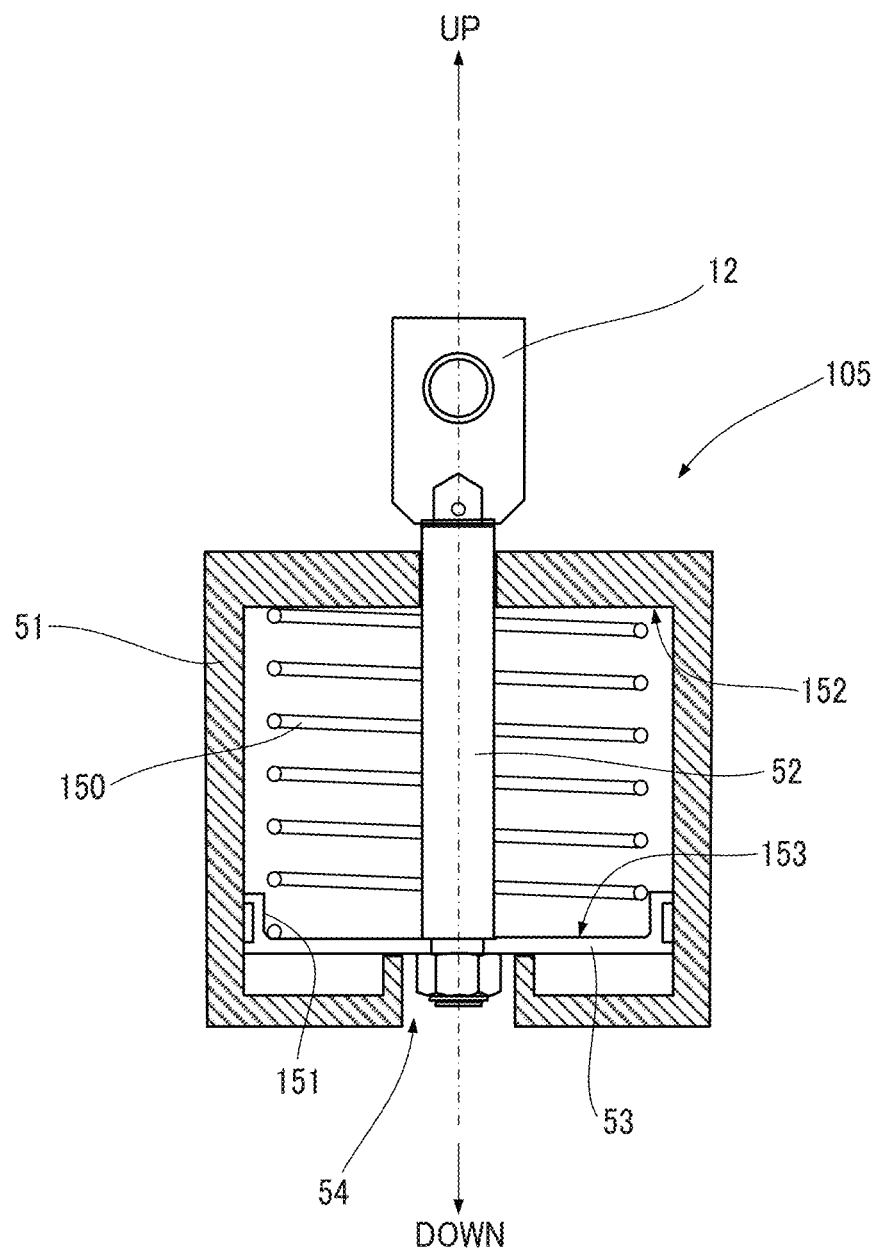
FIG. 13 is a diagram illustrating a schematic structure of a hydraulic cylinder incorporating a spring that can be used in the electro-hydraulic actuator according to the embodiment.

In the pilot pressure generating mechanism 180 in the hydraulic circuit according to the second variation, although the unloading relief valve 80 is composed of the parent valve 81 and the child valve 82, alternatively the parent valve 81 and the child valve 82 constituting the unloading relief valve 80 may be integrally configured as a single unit. FIG. 12 shows a pilot pressure generating mechanism 180 in which the parent valve 81, the child valve 82, and the throttle mechanism 83 are integrally configured as a single unit. In FIG. 12, the same reference numerals are used to designate the components corresponding to the parts and members shown in FIGS. 7 to 9. In FIG. 12, the components corresponding to the parent valve 81 and the child valve 82 are shown with different hatching. In the child valve 82 shown in FIG. 12, the valve body 826 is conical rather than spherical. In any case, the form of the unloading relief valve 80 is not limited as long as the function and operation are the same.

Some or all of the flow paths constituting the hydraulic circuit may be formed using piping, rather than being formed in a metal block such as the connecting block 2 or the manifold block 6. Also, the unloading valve 61 and the relief valve 62 do not have to be attached to the manifold block 6, and may be attached to the connecting block 2 or inserted in the middle of the piping. In any case, it is sufficient if the flow paths (201 to 203) corresponding to the hydraulic circuit shown in FIG. 4 are formed. Also, the pump 7 is not limited to an external gear pump, and may be an internal gear pump, an impeller pump, or the like.

In the above-mentioned embodiment, the throttle mechanism (27, 83, 205) is not limited to the above-mentioned orifice, which is a fixed throttle, and may instead be a throttle valve that is a variable throttle. The throttle valve can variably adjust the flow rate by finely adjusting the opening of the valve body. For example, in the hydraulic circuits shown in FIG. 4 and FIG. 6, when the pilot pressure set in the unloading valve 61 is not constant depending on the application or specifications of the thruster 1, the desired pilot pressure can be variably set. However, there are individual differences in the relationship between the adjustment amount of the opening and the actual opening of the valve body of the throttle valve.

On the other hand, an orifice, which is a fixed throttle, has little individual variation, and if the thruster 1 is of the same model, as long as the throttle opening is specified, multiple orifices with the specified opening can be manufactured, eliminating the need to adjust the opening individually for multiple thrusters 1 of the same model. In this way, a thruster 1 using an orifice as a throttle mechanism can reduce the cost of adjusting the throttle opening. In addition, an orifice has no moving parts, is highly dependable, and is cheaper than a throttle valve, so the parts cost of the thruster 1 can be reduced. In any case, an appropriate throttle mechanism (27, 83, 205) can be adopted depending on the specifications of the thruster 1 and the performance required of the thruster 1.

In the thruster 1 according to the above embodiment, although the piston 53 is constantly urged downward by the urging mechanism 50 such as an external mechanism connected to the head 12 at the tip of the piston rod 52 of the hydraulic cylinder 5, alternatively a spring for constantly urging the piston 53 downward may be incorporated in the cylinder tube 51. FIG. 12 shows an example of a hydraulic cylinder 105 in which a spring 150 is incorporated in the cylinder tube 51. Here, assuming that the axial direction of the piston rod 52 is the up-down direction and that the piston 53 is pushed upward when the pump 7 is operated, the up-down directions are defined. In the hydraulic cylinder 105 shown in FIG. 12, the piston 53 is not cylindrical but is disk-shaped with a raised rim 151. A spring 150 having a helical axis in the axial direction of the piston rod 52 is disposed between the inner surface 152 at the upper end of the cylinder tube 51 and the upper surface 153 of the piston.

Although the hydraulic cylinder 5 in the thruster 1 according to the above embodiment is arranged so that the piston 53 reciprocates in the vertical direction, alternatively the hydraulic cylinder 5 can also be arranged so that it reciprocates in a direction intersecting the motor shaft 31 (e.g., a perpendicular direction).

In the hydraulic circuits shown in FIG. 4 and FIG. 6, although the pilot pressure generating mechanism 20 is composed of the throttle mechanism 27 and the check valve 26, the pilot pressure generating mechanism 20 can also be composed of the check valve 26 alone. Specifically, the check valve 26 is configured to allow hydraulic oil to pass in the forward direction from the pump 7 toward the cylinder tube 51 at a low hydraulic pressure, while the check valve 26 prevents hydraulic oil from flowing backward from the cylinder tube 51 toward the pump 7 due to its function. Therefore, a check valve 26 is used that allows hydraulic oil to pass in the forward direction when hydraulic oil pressure equal to or greater than the pilot pressure is applied in the forward direction. This allows the pilot pressure generating mechanism 20 to be composed of only the check valve 26.

If the pilot pressure generating mechanism 20 were to be constructed only from the check valve 26, the number of parts in the thruster 1 would be reduced, and it would be possible to provide the thruster 1 at a lower cost. On the other hand, the pilot pressure for operating the unloading valve 61 is a relatively large hydraulic pressure, so the check valve 26, which prevents hydraulic oil from passing in the forward direction below this hydraulic pressure, would naturally be large. This would make it difficult to miniaturize the thruster 1. In any case, the configuration of the pilot pressure generating mechanism 20 may be appropriately determined depending on the manufacturing costs and specifications required for the thruster 1.

The thruster 1 shown as an embodiment includes a hydraulic cylinder 5 as a hydraulic actuator, but the hydraulic actuator does not have to be a direct-acting hydraulic actuator, in which a movable part such as a piston 53 reciprocates in a linear direction, as in the hydraulic cylinder 5. For example, the hydraulic actuator may include a rotating movable part, such as a hydraulic actuator including a rotor that rotates at a predetermined angle by hydraulic pressure as a movable part in a sealed stator. An electro-hydraulic actuator including such a hydraulic actuator in which a movable part rotates may be configured to reciprocate between a first operating state corresponding to a rotation angle position of the rotor when the inside of the stator is not pressurized by hydraulic oil, and a second operating state corresponding to a rotation angle position when the stator is filled with sufficiently pressurized hydraulic oil and the rotor rotates by a predetermined angle from the first operating state. In addition, as an urging mechanism in an electro-hydraulic actuator having a movable part that rotates by hydraulic pressure, for example, a helical spring that constantly urges the rotor to a rotation position that corresponds to the first operating state may be considered.

Naturally, the hydraulic fluid in an electro-hydraulic actuator is not limited to hydraulic oil, but may instead be water, air, steam, or any other fluid capable of generating hydraulic pressure for operating the hydraulic actuator.

LIST OF REFERENCE NUMERALS

1 Thruster (electro-hydraulic actuator, electric hydraulic cylinder)
2 Connecting block
3 Motor 4 Reservoir
5, 105 Hydraulic cylinder
6 Manifold block
7 Pump
11 Clevis
12 Head
20, 180 Pilot pressure generating mechanism
21 Communication hole
23 Connecting member
24 Inlet port
25 Outlet
26 Check valve
27, 73, 205 Throttle mechanism
31 Motor shaft
50 Biasing mechanism
51 Cylinder tube
52 Piston rod
53 Piston
54 Port of (hydraulic cylinder 5)
61 Unloading valve
62 Relief valve
68a, 68b Discharge ports
80 Unloading relief valve
81 Parent valve of unloading relief valve
82 Unloading relief valve child valve
150 Spring (biasing mechanism)
90 Unit including unloading relief valve
91 Metal block
201 Pressurizing flow path
201a, 201b Flow paths constituting the pressurizing flow path
202 Pressure adjustment flow path
202a to 202c Flow paths constituting the pressure adjustment flow path
203 Pressure reduction flow path
203a to 203f, 301 Pilot flow path constituting a pressure reducing flow path
300 Discharge flow path constituting a pressure reduction flow path
811 Primary port of parent valve
812 Secondary port of parent valve
813 Pilot port of parent valve
814 Throttle valve
815 Parent valve housing
817 Parent valve spool
818 Parent valve spring
823 Pilot port of child valve
821 Primary port of child valve
822 Secondary port of child valve
824 Housing of child valve
825 Spool of child valve
826 Ball valve
827 Child valve spring

The invention claimed is:

1. An electro-hydraulic actuator comprising:
a motor that outputs rotational power;
a pump operated by the rotational power of the motor;
a hydraulic actuator operated by hydraulic fluid pressurized by the pump;
a reservoir for storing the hydraulic fluid; and
a hydraulic circuit for hydraulically controlling operation of the hydraulic actuator,
wherein the hydraulic actuator reciprocates between a first operating state and a second operating state in response to a hydraulic pressure of the supplied hydraulic fluid, and is constantly biased in a direction returning to the first operating state;
wherein the hydraulic circuit includes:
a pressurizing flow path for supplying the hydraulic fluid pressurized by the pump to the hydraulic actuator;
a pressure reducing flow path that connects the hydraulic actuator and the reservoir via an unloading valve in an openably closable manner;
a pilot flow path for supplying hydraulic oil pressurized to a pilot pressure to the unloading valve in order to close the pressure reducing flow path;
a pilot pressure generating mechanism that generates the pilot pressure; and
a check valve disposed within the pressurizing flow path for allowing the hydraulic fluid to pass only in a forward direction from the pump to the hydraulic actuator,
wherein the pilot pressure generating mechanism generates the pilot pressure during operation of the pump,
the pilot flow path branches off midway from the pump to the check valve in the pressurizing flow path and reaches the unloading valve, and
during operation of the pump, the pilot pressure is generated, causing the pump to transition to the second operating state, and when the pump stops, the pilot pressure disappears, the pressure reducing flow path is opened, and the pump returns to the first operating state,
wherein a throttle mechanism constituting the pilot pressure generating mechanism and the check valve are disposed, in that order, in the pressurizing flow path from the pump to the hydraulic actuator.

2. The electro-hydraulic actuator of claim 1, wherein the throttle mechanism is an orifice.

3. An electro-hydraulic actuator comprising:
a motor that outputs rotational power;
a pump operated by the rotational power of the motor;
a hydraulic actuator operated by hydraulic fluid pressurized by the pump;
a reservoir for storing the hydraulic fluid; and
a hydraulic circuit for hydraulically controlling operation of the hydraulic actuator,
wherein the hydraulic actuator reciprocates between a first operating state and a second operating state in response to a hydraulic pressure of the supplied hydraulic fluid, and is constantly biased in a direction returning to the first operating state;
wherein the hydraulic circuit includes:
a pressurizing flow path for supplying the hydraulic fluid pressurized by the pump to the hydraulic actuator;
a pressure reducing flow path that connects the hydraulic actuator and the reservoir via an unloading valve in an openably closable manner;
a pilot flow path for supplying hydraulic oil pressurized to a pilot pressure to the unloading valve in order to close the pressure reducing flow path;
a pilot pressure generating mechanism that generates the pilot pressure; and
a check valve disposed within the pressurizing flow path for allowing the hydraulic fluid to pass only in a forward direction from the pump to the hydraulic actuator,
wherein the pilot pressure generating mechanism generates the pilot pressure during operation of the pump,
the pilot flow path branches off midway from the pump to the check valve in the pressurizing flow path and reaches the unloading valve, and
during operation of the pump, the pilot pressure is generated, causing the pump to transition to the second operating state, and when the pump stops, the pilot pressure disappears, the pressure reducing flow path is opened, and the pump returns to the first operating state, wherein the pilot pressure generating mechanism is composed of an unloading relief valve having a parent valve and a child valve, and a throttle mechanism, the parent valve has a built-in throttle valve, a parent valve primary port connected to the pilot flow path, a parent valve secondary port connected to a flow path communicating with the reservoir, a parent valve pilot port communicating with the parent valve primary port via the throttle valve, and has, with a predetermined direction being the up-down direction, a parent valve spool that is urged upward by hydraulic pressure at the parent valve primary port, and a parent valve spring that urges the parent valve spool downward, the child valve has a child valve primary port connected to the parent valve pilot port, a child valve secondary port connected to a flow path communicating with the reservoir via the throttle mechanism, and a child valve pilot port connected to a flow path from the check valve to the hydraulic actuator, and has, with a predetermined direction being a vertical direction, a valve body that is urged upward by hydraulic pressure at the child valve primary port, a child valve spool that is urged upward by hydraulic pressure at the child valve pilot port, and a child valve spring that urges the valve body downward, the child valve distributes hydraulic pressure P1 at the child valve primary port into hydraulic pressure P2, which presses the valve body upward, and hydraulic pressure P3, which presses the child valve spool downward, with P2>P3, and when the hydraulic pressure P1 reaches a predetermined cutout pressure, the valve body is pressed in one direction, opening the child valve primary port and the child valve secondary port to enter an unloaded state, the parent valve spool is pressed upward by a pressure difference between the hydraulic pressure P1 on the parent valve pilot port side, which has been reduced in association with the unloaded state of the child valve, and hydraulic pressure P5 on the parent valve primary port side, thereby opening the parent valve primary port and the parent valve secondary port and putting the parent valve in an unloaded state, when the child valve is in an unloaded state, the unloaded state is maintained by hydraulic pressure P4 at the child valve pilot port, when both the parent valve and the child valve are in the unloaded state, the hydraulic pressure P5 is maintained at the pilot pressure by the hydraulic pressure P1 generated by the passing resistance of the throttle mechanism and the hydraulic pressure generated by the parent valve spring urging the parent valve spool downward, and the hydraulic actuator is maintained in the second operating state by the hydraulic pressure P4.

4. The electro-hydraulic actuator of claim 3, wherein the unloading relief valve is a single integrated unit in which the parent valve and the child valve are attached to a metal block in which the flow path for the hydraulic fluid is formed, and the parent valve and the child valve are cartridges configured to be attachably detachable from the metal block.

5. The electro-hydraulic actuator according to claim 4, wherein the throttle mechanism is interposed midway through a flow path formed in the metal block, and the unit constitutes the pilot pressure generating mechanism.

\* \* \* \* \*